(12) United States Patent  
Kawakami

(10) Patent No.: US 11,627,247 B2  
(45) Date of Patent: Apr. 11, 2023

(54) IMAGING APPARATUS CAPABLE OF AUTOMATICALLY CAPTURING IMAGE OF SUBJECT, CONTROL METHOD, AND STORAGE MEDIUM

(71) Applicant: CANON KABUSHIKI KAISHA, Tokyo (JP)

(72) Inventor: Takashi Kawakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/510,042

(22) Filed: Oct. 25, 2021

(65) Prior Publication Data

US 2022/0132025 A1 Apr. 28, 2022

(30) Foreign Application Priority Data

Oct. 27, 2020 (JP) .............................. JP2020-179541

(51) Int. Cl.
*H04N 5/232* (2006.01)

(52) U.S. Cl.
CPC ..... *H04N 5/23219* (2013.01); *H04N 5/23206* (2013.01); *H04N 5/23222* (2013.01)

(58) Field of Classification Search
CPC ........... H04N 5/23219; H04N 5/23206; H04N 5/23222; H04N 5/23245; H04N 5/23296; H04N 5/23299
See application file for complete search history.

(56) References Cited

U.S. PATENT DOCUMENTS

2016/0182814 A1* 6/2016 Schwesinger ...... H04N 5/23296  
348/14.03

FOREIGN PATENT DOCUMENTS

JP      2019106694 A    6/2019  
JP      2019117375 A    7/2019

\* cited by examiner

*Primary Examiner* — Yogesh K Aggarwal  
(74) *Attorney, Agent, or Firm* — Canon U.S.A., Inc. IP Division

(57) ABSTRACT

An imaging apparatus includes an imaging unit configured to capture an image of a subject, a search unit configured to search for a subject which is an imaging target to be captured by the imaging unit, and a reception unit configured to receive a change instruction for changing the imaging target from the subject currently being captured by the imaging unit without specifying a change destination imaging target, wherein, in a case where the change instruction is received, the search unit searches for another subject.

17 Claims, 12 Drawing Sheets

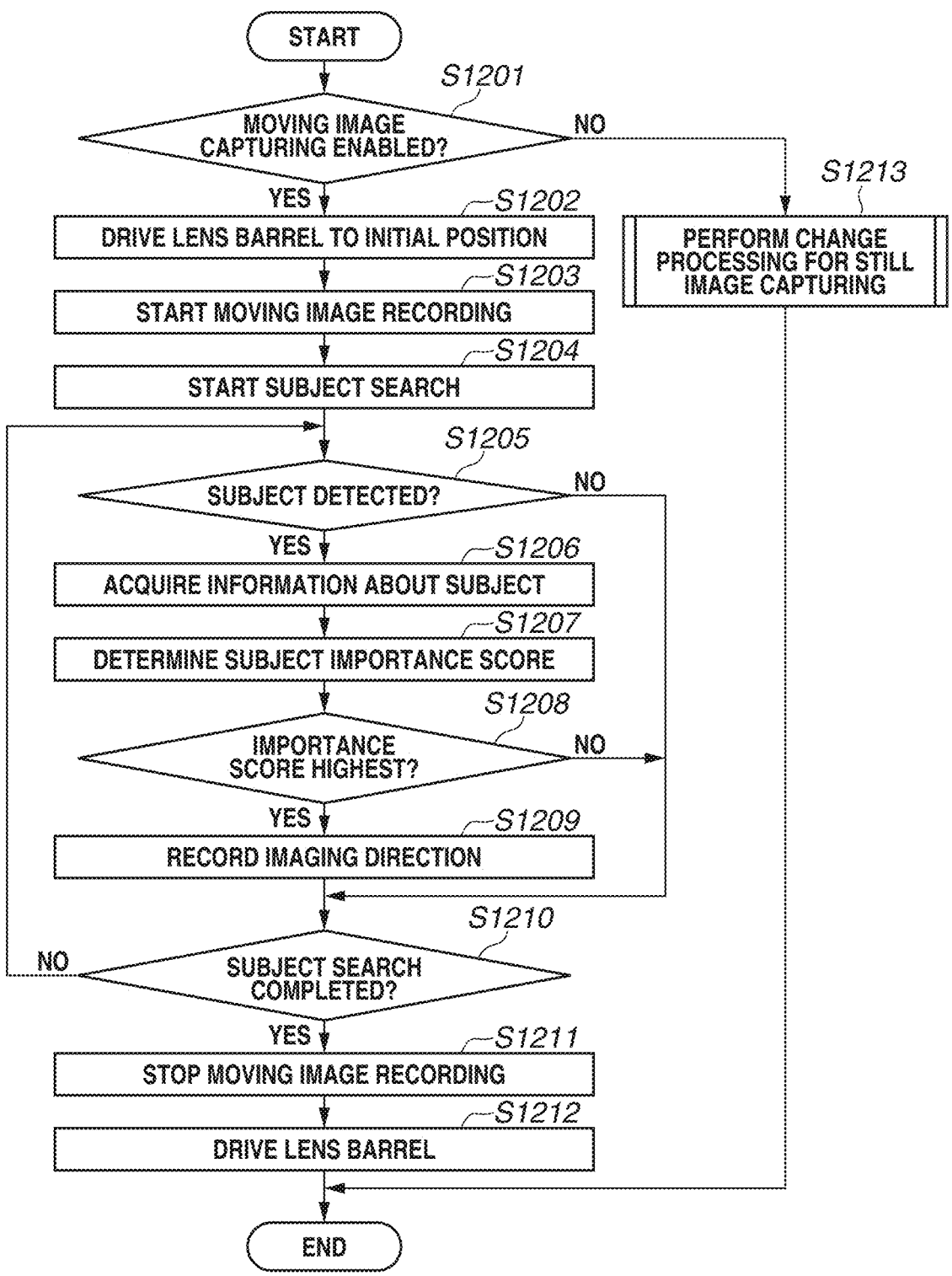

IMAGING APPARATUS CAPABLE OF AUTOMATICALLY CAPTURING IMAGE OF SUBJECT, CONTROL METHOD, AND STORAGE MEDIUM

BACKGROUND

Field of the Disclosure

The present disclosure relates to an imaging apparatus capable of automatically capturing an image of a subject.

Description of the Related Art

In recent years, there has been proposed a life log camera that periodically repeats image capturing and an imaging apparatus that automatically captures an image of its periphery. Such an imaging apparatus aims for capturing an image of a scene intended by the user by automatically capturing an image of a subject without the user being conscious of it. Japanese Patent Application Laid-Open No. 2019-117375 discusses an imaging apparatus capable of capturing an image of a subject by automatically performing pan drive and tilt drive.

However, the imaging apparatus discussed in Japanese Patent Application Laid-Open No. 2019-117375 automatically performs pan drive and tilt drive and therefore does not necessarily capture an image of a subject intended by the user.

SUMMARY

An imaging apparatus includes an imaging unit configured to capture an image of a subject, a search unit configured to search for a subject which is an imaging target to be captured by the imaging unit, and a reception unit configured to receive a change instruction for changing the imaging target from the subject currently being captured by the imaging unit without specifying a change destination imaging target, wherein, in a case where the change instruction is received, the search unit searches for another subject.

Further features of the present disclosure will become apparent from the following description of exemplary embodiments with reference to the attached drawings.

BRIEF DESCRIPTION OF THE DRAWINGS

FIG. 12 is a flowchart illustrating subject change processing according to a third exemplary embodiment.

DESCRIPTION OF THE EMBODIMENTS

Exemplary embodiments of the present disclosure will be described in detail below with reference to the accompanying drawings.

The following exemplary embodiments are to be considered as illustrative examples for achieving the present disclosure, and may be corrected or modified as required depending on the configuration of an apparatus according to the present disclosure and other various conditions. The exemplary embodiments may be suitably combined.

<Configuration of Imaging Apparatus>

Figure 1A:
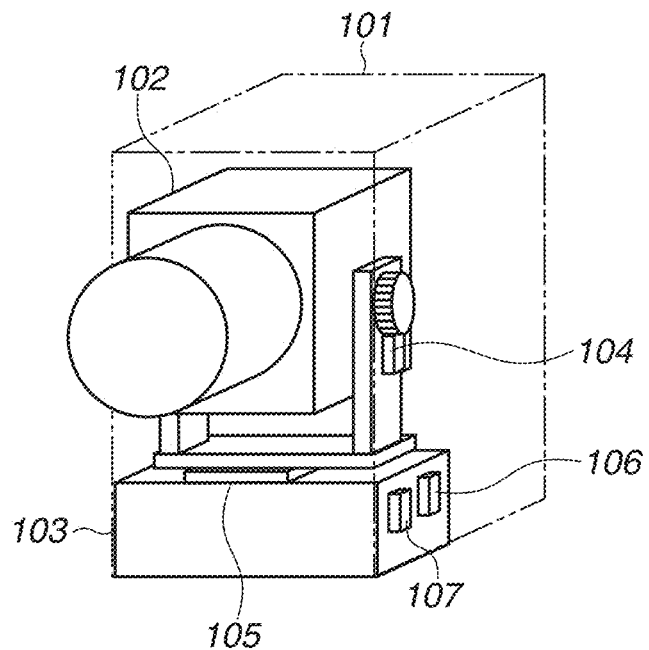
FIG. 1A illustrates an example outer appearance of an imaging apparatus according to a first exemplary embodiment.
Figure 1B:
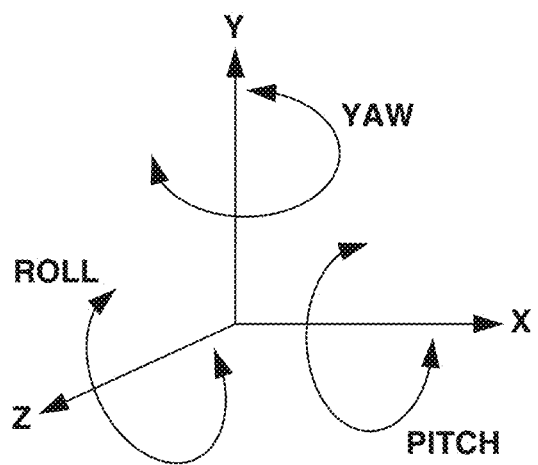
FIG. 1B illustrates an operation of the imaging apparatus according to the first exemplary embodiment.

A first exemplary embodiment will be described. FIGS. 1A and 1B illustrate a configuration of an imaging apparatus according to the first exemplary embodiment.

An imaging apparatus 101 illustrated in FIG. 1A is provided with operation members including a power switch that enables turning power ON and OFF. The operation members include a touch panel.

A lens barrel 102 is a housing including an optical lens group and an image sensor. The lens barrel 102 is attached to the imaging apparatus 101. A tilt rotation unit 104 and a pan rotation unit 105 are rotation mechanisms that rotatably drive the lens barrel 102 with respect to a fixed unit 103. The tilt rotation unit 104 is, for example, a motor that enables rotating the lens barrel 102 in the pitch direction illustrated in FIG. 1B. The pan rotation unit 105 is, for example, a motor that enables rotating the lens barrel 102 in the yaw direction illustrated in FIG. 1B. The tilt rotation unit 104 and the pan rotation unit 105 rotatably drives the lens barrel 102 in one or more directions. According to the present exemplary embodiment, the Y-axis illustrated in FIG. 1B is the rotation axis of the pan rotation unit 105. According to the present exemplary embodiment, the positive direction of the Z axis illustrated in FIG. 1B is the front direction of the imaging apparatus 101.

An angular velocity meter 106 and an accelerometer 107 are, for example, a gyro sensor and an acceleration sensor, respectively, and are disposed in the fixed unit 103 of the imaging apparatus 101. The imaging apparatus 101 detects vibrations of the imaging apparatus 101 based on the velocities measured by the angular velocity meter 106 and the accelerometer 107. By rotatably driving the tilt rotation unit 104 and the pan rotation unit 105 based on the detected vibration of the imaging apparatus 101, the imaging apparatus 101 generates an image with the corrected shake and inclination in the lens barrel 102.

Figure 2:
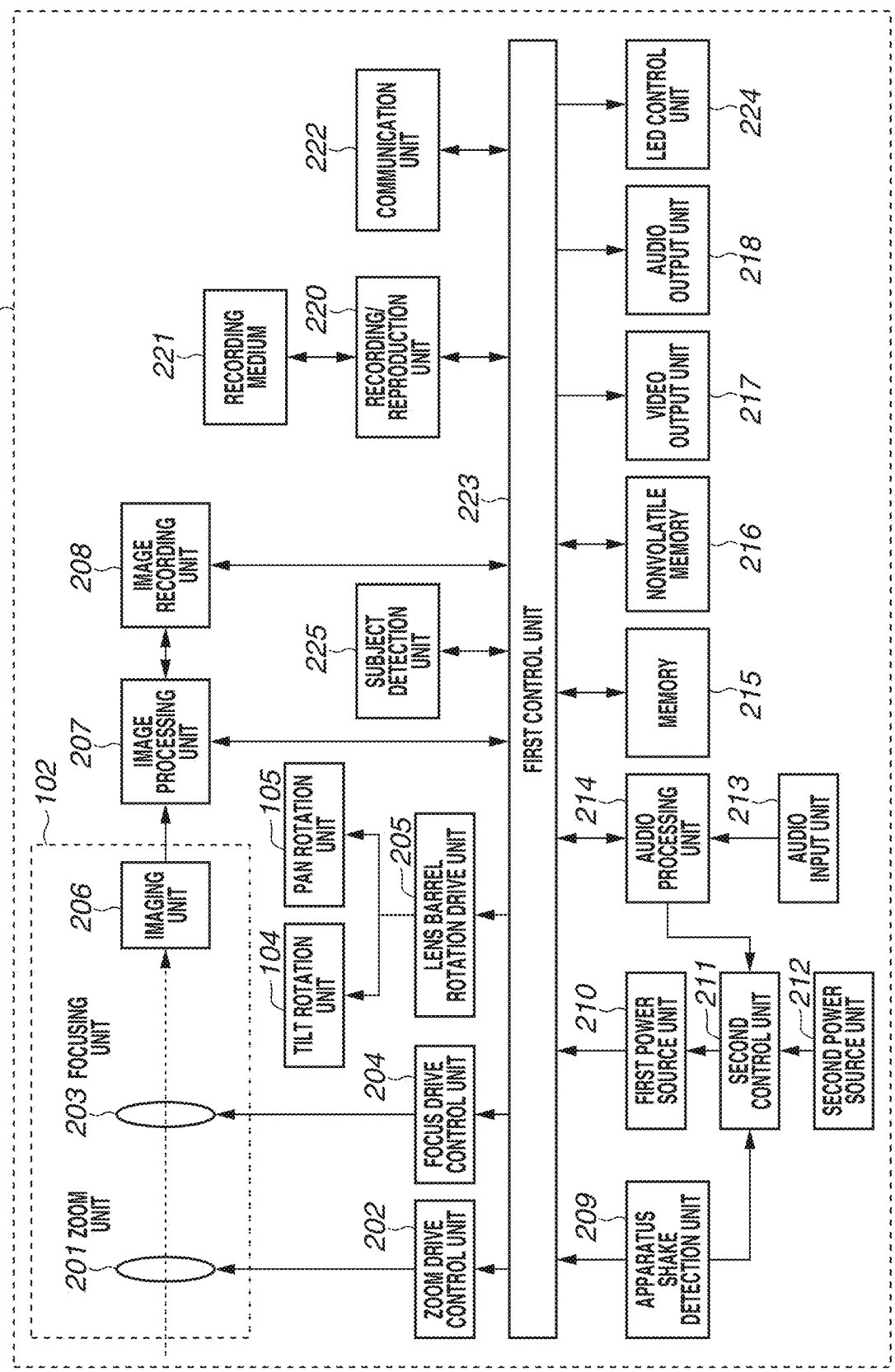
FIG. 2 illustrates a configuration of the imaging apparatus according to the first exemplary embodiment.

FIG. 2 is a block diagram illustrating a configuration of the imaging apparatus 101 according to the present exemplary embodiment.

A first control unit 223 includes a processor (e.g., central processing unit (CPU), graphics processing unit (GPU), microprocessor, and micro processing unit (MPU)), and a memory (e.g., a dynamic random access memory (DRAM) and a static random access memory (SRAM)). The first control unit 223 performs various processing to control each block of the imaging apparatus 101 and control data transmission between blocks. The first control unit 223 is an example of a control unit and a determination unit.

A nonvolatile memory 216, which is a data recordable and erasable memory, stores constants and programs for operations of the first control unit 223.

A zoom unit 201 is an optical lens group including a zoom lens that performs zoom magnification. The zoom drive control unit 202 is a control unit that controls the drive of the optical lens of the zoom unit 201. A focus unit 203 is an optical lens group that performs focus adjustment.

A focus drive control unit 204 controls the drive of the optical lens of the focus unit 203. In an imaging unit 206, the image sensor receives incident light through each optical lens group and outputs information about electric charge corresponding to the light quantity as analog image data, to an image processing unit 207. The zoom unit 201, the zoom drive control unit 202, the focus unit 203, the focus drive control unit 204, and the imaging unit 206 are included in the lens barrel 102.

The image processing unit 207 subjects the image data input from the imaging unit 206 to distortion correction, white balance adjustment, color interpolation processing, and other image processing, and outputs digital image data. The digital image data output from the image processing unit 207 is converted into an image file format such as the Joint Photographic Experts Group (JPEG) format and a moving image file format such as the Moving Picture Experts Group (MPEG) format by an image recording unit 208. The resultant digital image data is transmitted to a memory 215 and a video output unit 217 (described below). When recording the digital image data recorded in the memory 215 to a recording medium 221, the first control unit 223 outputs the digital image data to a recording/reproduction unit 220.

A lens barrel rotation drive unit 205 drives the tilt rotation unit 104 and the pan rotation unit 105 to drive the lens barrel 102 in the tilt and pan directions, respectively. The lens barrel rotation drive unit 205 is an example of a driving unit.

An apparatus shake detection unit 209 includes, for example, the angular velocity meter 106 that detects the angular velocity in the 3-axis directions of the imaging apparatus 101, and the accelerometer 107 that detects the acceleration in the 3-axis directions of the imaging apparatus 101. The apparatus shake detection unit 209 calculates the rotational angle and shift amount of the imaging apparatus 101 based on signals detected by the angular velocity meter 106 and the accelerometer 107.

The audio input unit 213 having a plurality of microphones subjects audio signals input from the microphones to analog-to-digital (AD) conversion, and outputs the resultant digital signal to the audio processing unit 214.

The audio processing unit 214 can detect the sound direction on the plane where the plurality of microphones is installed. The detected sound direction can be used for search and automatic image capturing (described below). The audio processing unit 214 can further detect specific audio commands. The present exemplary embodiment uses two different specific audio commands: a trigger word and a command word. The trigger word is a command that serves as a trigger for starting the recognition of a command word. For example, the trigger word is a command including a specific keyword such as "OK, camera" uttered by the user. The command word is a command for instructing the imaging apparatus 101 to perform predetermined processing. Examples of the predetermined processing include still image capture processing, moving image capturing start processing, moving image capturing end processing, sleep processing, subject change processing, and automatic image capture processing. The command word includes a keyword that is different for each piece of processing, such as "Capture a still image" for the still image capture processing and "Capture a moving image" for the moving image capturing start processing. These audio commands are pre-recorded in the memory 215 of the imaging apparatus 101. The imaging apparatus 101 may be configured to register audio commands for performing arbitrary processing by the user in addition to pre-recorded audio commands.

The audio processing unit 214 subjects an input audio signal to optimization processing, encoding processing, and other audio processing. The audio signal processed by the audio processing unit 214 is transmitted to the memory 215 by the first control unit 223. The memory 215 temporarily records the data input from the image recording unit 208 and the audio signal input from the audio processing unit 214. When recording this audio signal, the first control unit 223 outputs the audio signal from the memory 215 to the recording/reproduction unit 220.

The recording/reproduction unit 220 records image data, audio signals, and other imaging-related control data to the recording medium 221. The recording medium 221 may be a recording medium built in the imaging apparatus 101 or a removable recording medium. The recording medium 221 can record image data, audio signals, and other various types of data. According to the present exemplary embodiment, the recording medium 221 has a larger capacity than the nonvolatile memory 216. For example, the recording medium 221 includes a hard disk, optical disk, magneto-optical disk, compact disc recordable (CD-R), digital versatile disc recordable (DVD-R), magnetic tape, nonvolatile semiconductor memory, flash memory.

The recording/reproduction unit 220 can read (reproduce) image data, audio signals, various data, and programs recorded in the recording medium 221. When reproducing image data and an audio signal recorded in the recording medium 221, the first control unit 223 operates as follows. The first control unit 223 outputs the image data and audio signal read by the recording/reproduction unit 220 to the image processing unit 207 and the audio processing unit 214, respectively. The image processing unit 207 and the audio processing unit 214 decode the image data and audio signal, respectively. The image processing unit 207 and the audio processing unit 214 output the decoded signal to the video output unit 217 and the audio output unit 218, respectively.

A second control unit 211 controls power to be supplied to the first control unit 223. For example, the second control unit 211 includes processors (e.g., CPU, microprocessor, and micro processing unit (MPU)) and a memory (e.g., DRAM and SRAM). According to the present exemplary embodiment, the second control unit 211 is provided separately from the first control unit 223 that controls the entire main system of the imaging apparatus 101.

The first power source unit 210 and the second power source unit 212 supply power to operate the first control unit 223 and the second control unit 211, respectively. According to the present exemplary embodiment, the power supplied by the first power source unit 210 is larger than the power supplied by the second power source unit 212. According to the present exemplary embodiment, the first power source unit 210 and the second power source unit 212 are selected according to the power to be supplied. For example, the first power source unit 210 is a switch for supplying power to the first control unit 223. The second power source unit 212 is a lithium cell or an alkaline dry cell. When the power switch on the imaging apparatus 101 is pressed, power is supplied to the second control unit 211 and then to the first control unit 223. The first control unit 223 can control the first power source unit 210 to turn OFF the power supply to the first control unit 223. Even while power is not being supplied to the first control unit 223, the second control unit 211 is operating to acquire information from the apparatus shake detection unit 209 and the audio processing unit 214. The second control unit determines whether to activate the first control unit 223 based on such input information. When the second control unit 211 determines to activate the first control unit 223, the second control unit 211 controls the first power source unit 210 to supply power to the first control unit 223. According to the present exemplary embodiment, the first power source unit 210 and the second power source unit 212 supply power from a battery. More specifically, the imaging apparatus 101 is also a portable terminal.

The audio output unit 218 outputs an audio signal such as an electronic shutter sound from a speaker built in the imaging apparatus 101 at the time of image capturing. A light emitting diode (LED) control unit 224 controls the LED on the imaging apparatus 101 to light up or blink with a preset pattern at the time of image capturing.

The video output unit 217 includes, for example, a video output terminal, and outputs an image signal for video display to a connected external display. The audio output unit 218 and the video output unit 217 may be an interface like one integrated terminal, for example, a High-Definition Multimedia Interface® (HDMI®) terminal.

A communication unit 222 is an interface that performs communication between the imaging apparatus 101 and an external apparatus. More specifically, the communication unit 222 transmits and receives such data as an audio signal and image data. When the communication unit 222 receives a control signal related to image capturing, such as image capturing start, image capturing end, pan drive, tilt drive, and zoom drive, the first control unit 223 drives the imaging apparatus 101 according to the received control signal. The communication unit 222 includes a wireless communication module. Examples of wireless communication modules include an infrared communication module, Bluetooth® communication module, wireless Local Area Network (LAN) communication module, wireless Universal Serial Bus (USB), and Global Positioning System (GPS) receiver.

A subject detection unit 225 reads image data output from the image processing unit 207 from the memory 215, and performs subject recognition for person and object. For example, to recognize a person, the subject detection unit 225 detects the face of the subject. A pattern for subject face determination is pre-registered in the imaging apparatus 101. This pattern is given an identifier for distinction of each subject. In subject face detection processing, the subject detection unit 225 detects the face of the subject by detecting the position that coincides with the pattern for determining the face of the subject included in the captured image. The subject detection unit 225 can distinguish each of a plurality of registered persons.

The subject detection unit 225 also calculates the reliability indicating the probability on the detected face of the subject at the same time. The reliability is calculated based on, for example, the size of the face region in the image and the coincidence with the face patterns. The subject detection unit 225 subjects the face of the subject to pattern matching in the image to detect face information including whether the detected face is a smile, whether the eyes are open, and the face orientation. The method for detecting the face information is not limited to the pattern matching. Known techniques including the use of deep learning are applicable. The subject detection unit 225 is an example of a detection unit.

In object recognition processing, the subject detection unit 225 determines whether the subject coincides with the pre-registered pattern to recognize an object. In addition, the subject detection unit 225 can recognize an object by extracting the feature quantity of the subject by using a histogram of the hue or saturation in the captured image.

The above-described methods enable the first control unit 223 to detect a subject based on the captured image data via the subject detection unit 225.

<System Configuration with External Apparatus>

Figure 3:
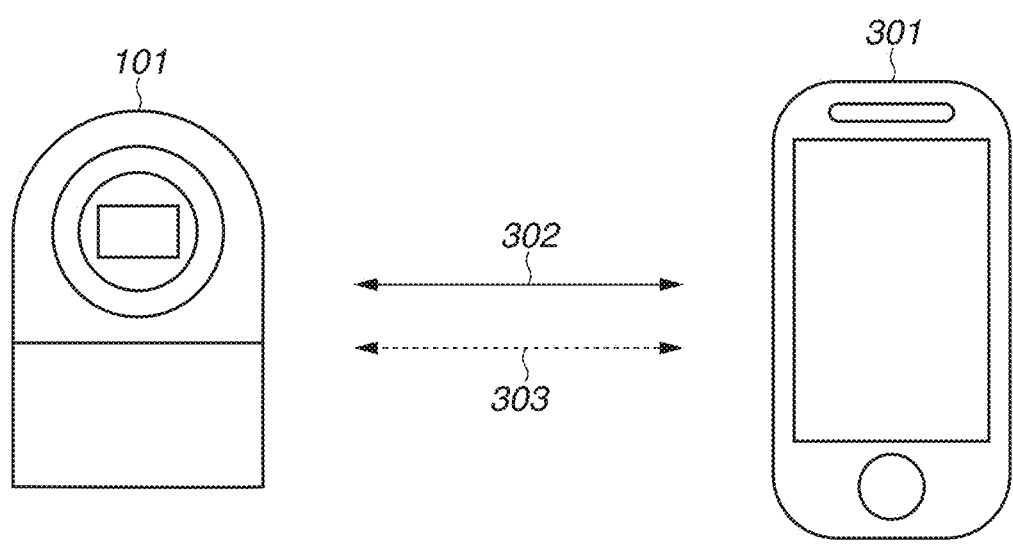
FIG. 3 illustrates a configuration of a communication system including the imaging apparatus and an external apparatus according to the first exemplary embodiment.

FIG. 3 illustrates an example of a wireless communication system including the imaging apparatus 101 and a smart device 301. The imaging apparatus 101 is, for example, a digital camera. The smart device 301 is, for example, a smartphone including a Bluetooth communication module and a wireless LAN communication module.

According to the present exemplary embodiment, the imaging apparatus 101 and the smart device 301 can communicate with each other via two different communication paths. One is a communication path 302 based on a wireless LAN conforming to the Institute of Electrical and Electronics Engineers (IEEE) 802.11 standard series, and the other is a communication path 303 based on a master-slave relation between a control station and a slave station, such as Bluetooth Low Energy. Wireless LAN and Bluetooth Low Energy are examples of communication methods. Assume a case where each communication apparatus has at least two different communication functions. For example, if one communication function based on the relation between a control station and a slave station can control the other communication function, other communication methods may be used. Without loss of generality, it is assumed that the first communication such as a wireless LAN enables communication at a higher communication rate than the second communication such as Bluetooth Low Energy, and that the second communication has at least either one of a lower power consumption and a shorter communicable distance than the first communication.

<Configuration of External Apparatus>

Figure 4:
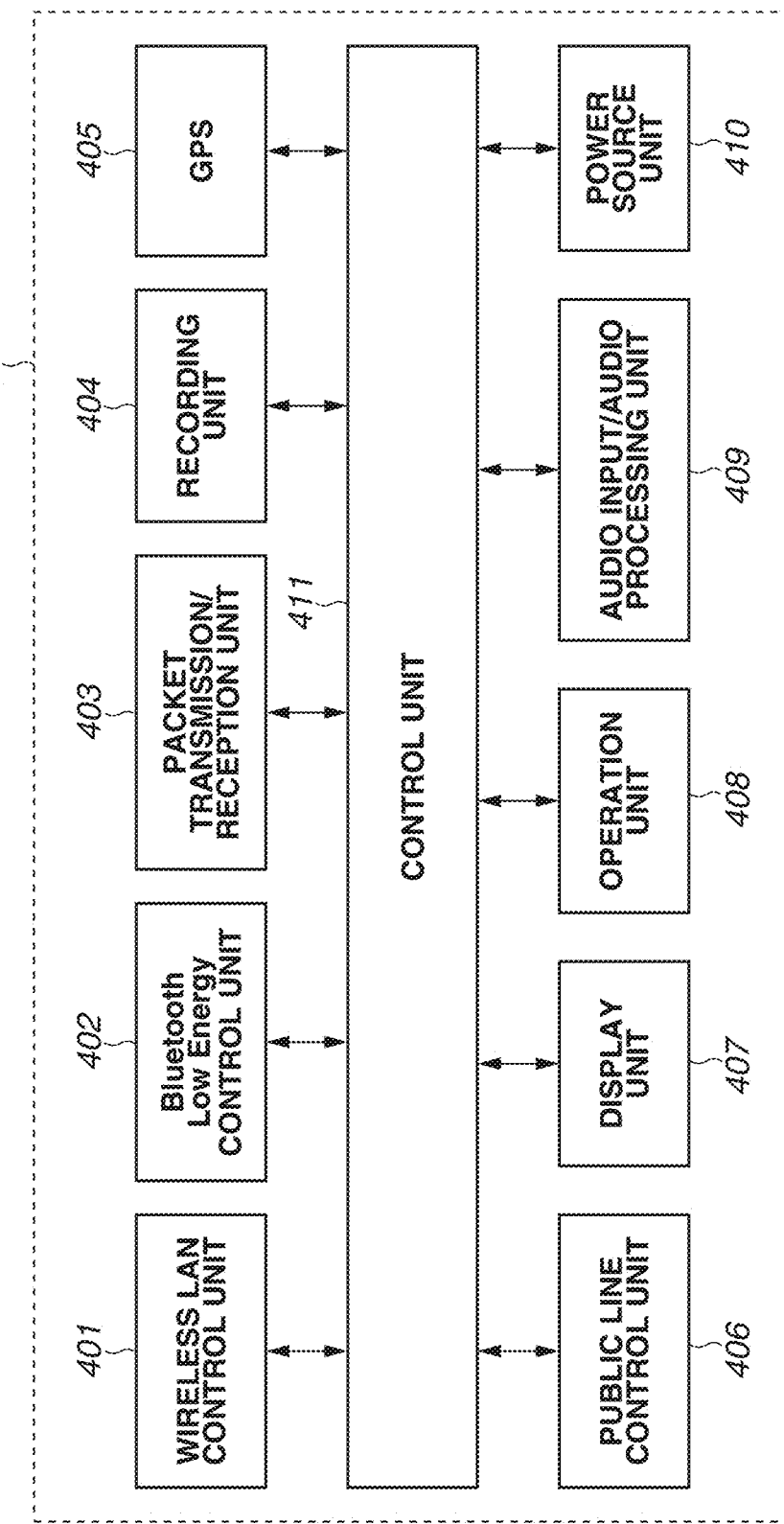
FIG. 4 illustrates a configuration of the external apparatus according to the first exemplary embodiment.

The configuration of the smart device 301 as an example of an external communication apparatus will be described below with reference to FIG. 4. A smart device 301 is a smartphone or mobile phone. In other words, the smart device 301 is a portable terminal.

The smart device 301 includes, for example, a wireless LAN control unit 401 for wireless LAN communication, a Bluetooth Low Energy control unit 402 for Bluetooth Low Energy communication, and a public communication circuit control unit 406 for public wireless communication. The smart device 301 further includes a packet transmission/reception unit 403.

The wireless LAN control unit 401 performs Radio Frequency (RF) control on wireless LAN, communication processing, and various control on wireless LAN communication conforming to the IEEE 802.11 standard series. The wireless LAN control unit 401 also performs protocol processing related to wireless LAN communication. The Bluetooth Low Energy control unit 402 performs RF control on Bluetooth Low Energy, communication processing, and various control on Bluetooth Low Energy communication. The Bluetooth Low Energy control unit 402 also performs protocol processing related to Bluetooth Low Energy communication. The public communication circuit control unit 406 performs RF control on public wireless communication, communication processing, and various control on public wireless communication. The public communication circuit control unit 406 also performs protocol processing related to public wireless communication. The public wireless communication conforms to, for example, the International Multimedia Telecommunication (IMT) standard and the Long Term Evolution (LTE) standard. The packet transmission/reception unit 403 performs processing for executing at least either one of packet transmission and reception related to wireless LAN, Bluetooth Low Energy communication, and public wireless communication. The present exemplary embodiment will be described below on the premise that the smart device 301 performs at least either one of packet transmission and reception in communication. However, communication formats other than packet switching, such as line switching, are also applicable.

The smart device 301 according to the present exemplary embodiment further includes a control unit 411, a recording unit 404, a GPS reception unit 405, a display unit 407, an operation unit 408, an audio input/audio processing unit 409, and a power source unit 410. The control unit 411 controls the entire smart device 301, for example, by executing a program recorded in the recording unit 404. The recording unit 404 records, for example, programs to be executed by the control unit 411, parameters necessary for communication, and other various information. Various operations of the smart device 301 (described below) are implemented when the control unit 411 executes programs recorded in the recording unit 404.

The power source unit 410 supplies power to each unit of the smart device 301. The display unit 407 has a function of outputting visually recognizable information by using a liquid crystal display (LCD) and an LED and outputting sound from a speaker, and displays and outputs various information. The operation unit 408 includes, for example, buttons for receiving a user operation on the smart device 301. The display unit 407 and the operation unit 408 may be configured by a common member such as a touch panel.

The audio input/audio processing unit 409 includes a microphone, for example, and performs speech recognition processing on an audio signal input from the microphone. The audio input/audio processing unit 409 can recognize a user operation on the imaging apparatus 101, through speech recognition. In the speech recognition processing, the audio input/audio processing unit 409 recognizes an audio command uttered by the user, based on the audio signal input from the microphone, by using a dedicated application. The smart device 301 can register an audio command for instructing the audio processing unit 214 of the imaging apparatus 101 to perform specific processing, to the imaging apparatus 101 via the communication path 302.

A GPS 405 analyzes a GPS signal received from a satellite to estimate the current position (longitude and latitude information) of the smart device 301. When the estimated current position is within a preset range (within a predetermined radial range), such as home, the smart device 301 notifies the imaging apparatus 101 of information about the current position via the Bluetooth Low Energy control unit 402. The imaging apparatus 101 can use the current position as a parameter for automatic image capturing and automatic editing (described below).

If the current position changes or deviates from a preset range, the smart device 301 notifies the imaging apparatus 101 of movement information via the Bluetooth Low Energy control unit 402. The imaging apparatus 101 can use the movement information as a parameter for automatic image capturing and automatic editing. The smart device 301 may estimate the current position of the smart device 301 based on information about circumferentially existing wireless networks, by using Wi-Fi Positioning System (WPS).

As described above, the smart device 301 exchanges data with the imaging apparatus 101 in communication via the wireless LAN control unit 401 and the Bluetooth Low Energy control unit 402. For example, the imaging apparatus 101 and the smart device 301 transmit and receive data such as an audio signal and image data. The smart device 301 can also transmit setting information related to image capturing of the imaging apparatus 101 to the imaging apparatus 101. The smart device 301 can also transmit control signals related to image capture processing of the imaging apparatus 101 and the positional information to the imaging apparatus 101.

<Automatic Image Capture Processing>

Automatic image capture processing refers to processing performed by the first control unit 223 to determine the image capture timing and automatically capture an image of a subject. In the automatic image capture processing, the first control unit 223 repeats a sequence of automatically capturing an image of a subject when a preferable still or moving image is determined to be able to be captured or when a certain time period has elapsed. This function enables the imaging apparatus 101 to capture unexpected preferable scenes and insensible changes of the subject during daily operations even if the user does not manually perform image capturing.

Figure 5:
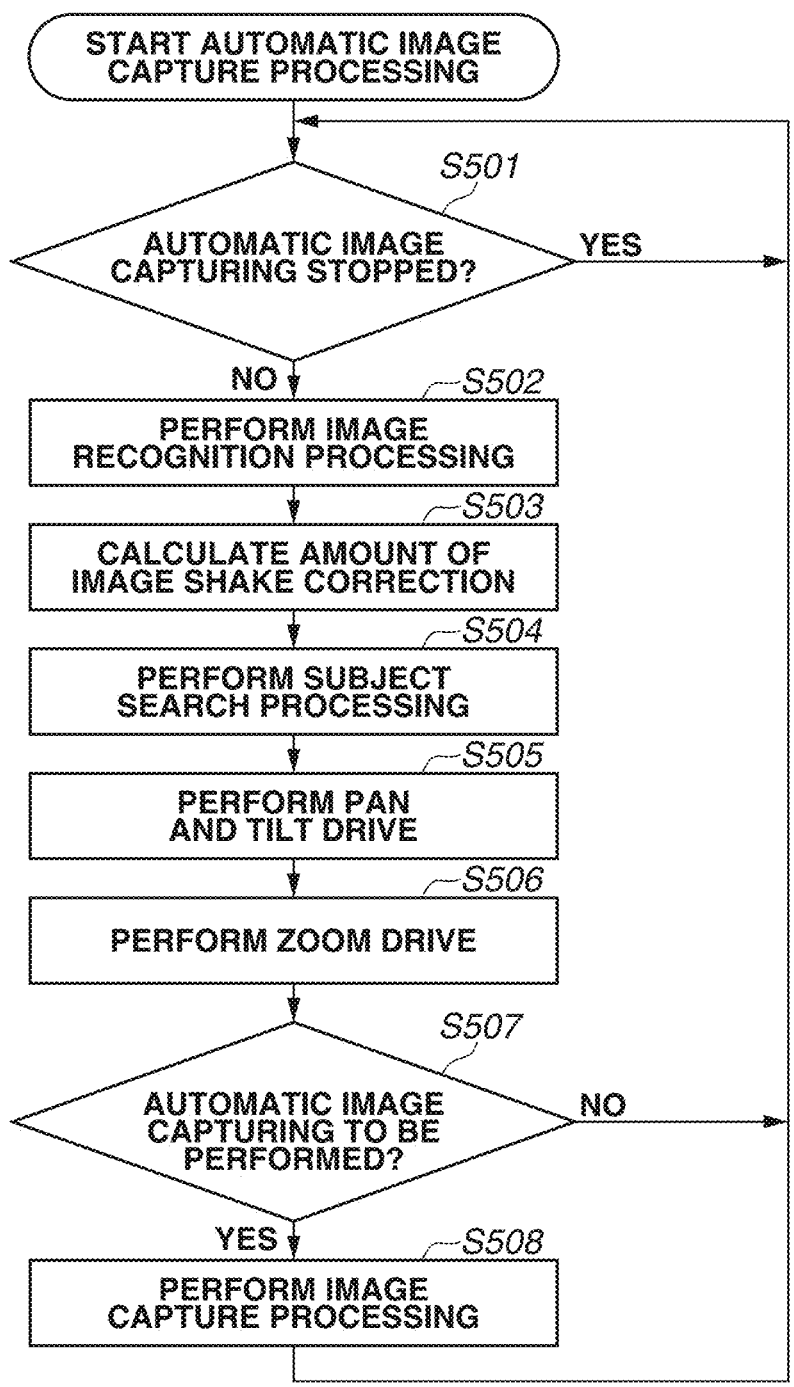
FIG. 5 is a flowchart illustrating automatic image capture processing according to the first exemplary embodiment.

FIG. 5 is a flowchart illustrating the automatic image capture processing of the imaging apparatus 101 according to the present exemplary embodiment.

The processing of this flowchart is started when the user turns ON the power switch of the imaging apparatus 101. According to the present exemplary embodiment, a wireless connection is established between the imaging apparatus 101 and the smart device 301. The user is able to perform various operations on the imaging apparatus 101 from a dedicated application on the smart device 301. Processing of each step in the following flowcharts is implemented when the first control unit 223 controls each unit of the imaging apparatus 101.

In step S501, the first control unit 223 determines whether the automatic image capture processing is stopped. The deactivation of the automatic image capture processing will be described below in the description of the speech recognition processing (described below). If the automatic image capture processing is stopped (YES in step S501), the first control unit 223 waits until the deactivation of the automatic image capture processing is canceled. More specifically, if the automatic image capture processing is stopped, the processing in step S501 is repeated until the deactivation of the automatic image capture processing is canceled. On the other hand, if the automatic image capture processing is not stopped (NO in step S501), the processing proceeds to step S502.

In step S502, the first control unit 223 instructs the image processing unit 207 to subject the signal captured by the imaging unit 206 to image processing to generate an image for subject recognition. The first control unit 223 further controls the subject detection unit 225 to perform subject recognition such as person recognition and animal recognition based on the generated image for subject recognition. For example, in performing subject recognition, the first control unit 223 prestores a pattern for determining a subject, and determines, via the subject detection unit 225, the subject based on the coincidence between the prestored pattern and the pattern included in the image for subject recognition. The first control unit 223 determines a subject and detects the position in the field angle of the subject.

In step S503, the first control unit 223 calculates the amount of image shake correction. More specifically, the first control unit 223 calculates the absolute angle of the imaging apparatus 101 based on the angular velocity and acceleration information acquired by the apparatus shake detection unit 209. Then, the first control unit 223 obtains the image stabilization angle for moving the tilt rotation unit 104 and the pan rotation unit 105 in the angular direction for canceling the absolute angle, and recognizes it as the amount of image shake correction.

In step S504, the first control unit 223 performs subject search processing. The subject search processing includes the following processing:

(1) Area Division

Figure 6B:
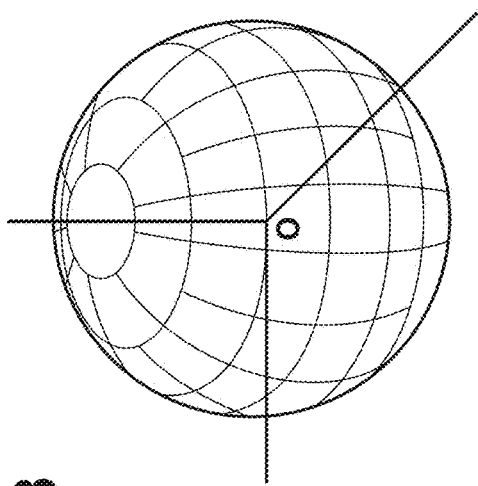
FIGS. 6A to 6D illustrate area division in a captured image according to the first exemplary embodiment.
Figure 6D:
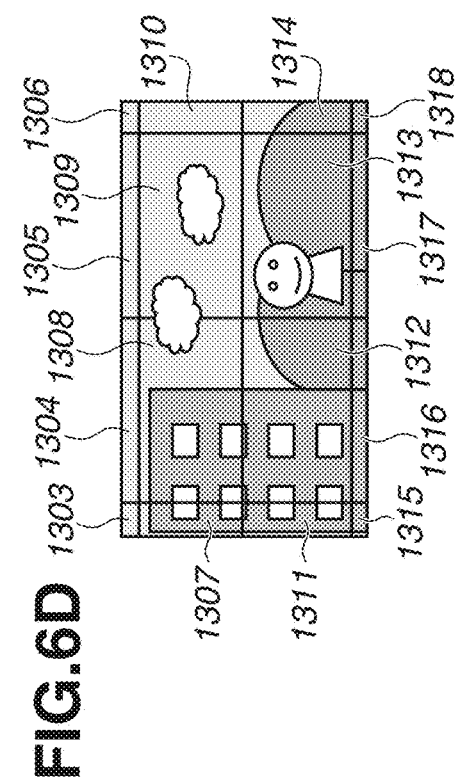
Figure 6A:
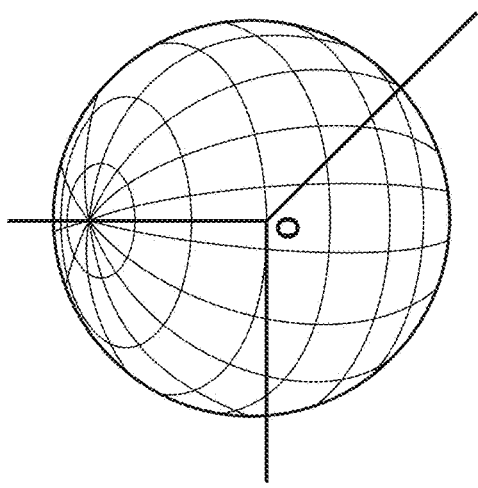
Figure 6C:
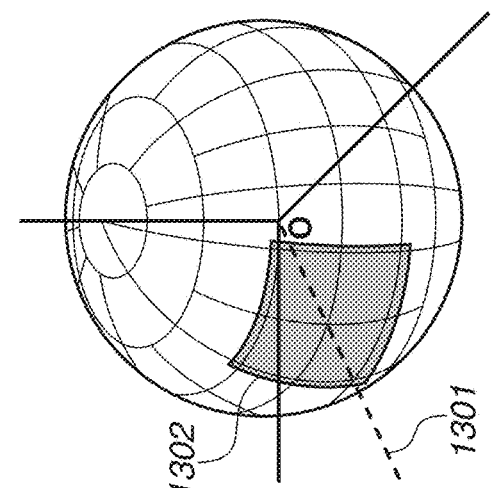

Area division will be described below with reference to FIGS. 6A to 6C. Referring to FIGS. 6A to 6C, area division is performed on the sphere with the position of the imaging apparatus 101 being the origin O. Referring to the example in FIG. 6A, the area is divided at intervals of 22.5 degrees in the tilt and pan directions.

When the area division is performed as illustrated in FIG. 6A, the circumference and the region of one area in the horizontal direction decrease with increasing tilt angle from 0 degrees. Accordingly, as illustrated in FIG. 6B, the imaging apparatus 101 according to the present exemplary embodiment sets the area range in the horizontal direction to an angle larger than 22.5 degrees in a case where the tilt angle is 45 degrees or more.

An area in the field angle of an image captured by the imaging apparatus 101 will be described below with reference to FIGS. 6C and 6D. An axis 1301 denotes the reference direction for the imaging direction of the imaging apparatus 101, and the area division is performed with reference to this reference direction. The axis 1301 is, for example, the imaging direction when the imaging apparatus 101 is activated or the direction predetermined as the reference direction for the imaging direction. An area 1302 is the field angle area of an image captured by the imaging unit 206. FIG. 6D illustrates an example of a live view captured in the area 1302 by the imaging unit 206. In the field angle of the live view in FIG. 6D, the image area is divided into areas 1303 to 1318 based on the area division illustrated in FIG. 6C.

(2) Calculation of Importance Level for Each Area

For each of the above-described division areas, the imaging apparatus 101 calculates the importance level indicating the priority in the subject search according to the status of the subject existing in the area and the scene status of the area. The importance level according to the subject status is calculated, for example, based on the number of subjects existing in the area, the facial size of the subject, the facial orientation of the subject, the probability of face detection for the subject, the facial expression of the subject, and the personal identification result of the subject. The importance level according to the scene status is calculated based on, for example, the general object recognition result, scene determination result (such as blue sky, backlight, and evening landscape), sound level and speech recognition result of sound from the area direction, and in-area movement detection information.

For example, if the face of the subject is registered, the first control unit 223 increases the importance level of the area where the face of the registered subject was detected. For example, the face of the subject is recorded in a nonvolatile memory 216 as a pattern for determining a subject. In a case where the importance level of the area where the face of the subject was detected is increased, the first control unit 223 returns the importance level of the area to the previous importance level when a predetermined time period elapses or when a predetermined number of images are captured.

(3) Search Area Determination

The first control unit 223 determines the importance level for each area as described above, and then determines to selectively perform the subject search in areas having a high importance level. Then, the first control unit 223 calculates the pan and tilt angles necessary to capture an image of one of areas having a high importance level.

In step S505, the first control unit 223 performs pan and tilt drive. More specifically, the first control unit 223 calculates the amount of pan drive and the amount of tilt drive based on the amount of image shake correction and the pan and tilt angles calculated in step S504. Then, the first control unit 223 controls the drive of the pan rotation unit 105 and the tilt rotation unit 104 via the lens barrel rotation drive unit 205 based on the calculated amount of pan drive and amount of tilt drive, respectively. According to the present exemplary embodiment, the first control unit 223 detects the subject in the area having a high importance level and starts the subject image capturing through the drive in step S505.

In step S506, the first control unit 223 controls the zoom unit 201 to perform zoom drive. For example, the first control unit 223 drives zooming according to the status of the subject for which image capturing was started in step S505. For example, if the face of the subject is captured in a very small size in the field angle, the first control unit 223 controls the zoom unit 201 to perform zooming in the telephoto direction so that the facial size of the subject is captured in a suitable size (larger) in the field angle. On the other hand, if the face of the subject is captured in a very large size in the field angle, the first control unit 223 controls the zoom unit 201 to perform zooming in the wide-angle direction so that the facial size of the subject is captured in a suitable size (smaller) in the field angle. Performing zoom control in this way enables maintaining the state that is suitable for subject tracking.

Although the above-described method performs the subject search by the pan, tilt, and zoom drive in steps S504 to S506, the subject search may be performed by an imaging system that performs image capturing in all directions at one time by using a plurality of wide-angle lenses. In this case, the entire processing load is too large to perform image processing such as the subject detection using all signals obtained by image capturing in all direction, as input images. Therefore, in this case, the first control unit 223 is configured to clip a part of images obtained by image capturing in all direction and then perform the subject search processing within the range of the clipped images.

In this configuration, the first control unit 223 calculates the importance level for each area, changes the clipping position based on the importance level, and determines the automatic image capturing (described below), like the above-described method.

This enables performing high-speed subject search while restricting the power consumption by image processing.

In step S507, the first control unit 223 determines whether to perform the automatic image capturing.

The determination whether to perform the automatic image capturing will be described below. The first control unit 223 determines whether to perform the automatic image capturing according to whether an image capturing score exceeds a predetermined value. The image capturing score refers to a parameter used to determine whether to perform the automatic image capturing. Points are added to the image capturing score according to the subject detection status and the passage of time. Assume designing an example case where the automatic image capturing is performed when the image capturing score exceeds 2,000 points. In this case, the image capturing score is initially 0 points, and points are added to the score over the passage of time since the timing when the automatic image capture mode is entered. For example, the image capturing score increases with such an increasing rate that the image capturing score reaches 2,000 points in 120 seconds. In this case, if 120 seconds have elapsed with no subject detected, the score reaches 2,000 points by the point addition due to the passage of time, and image capturing is performed. When a subject having a high priority is detected during the passage of time, 1,000 points are added to the score. For example, a subject having a high priority is a subject set as a target to be preferentially captured, by the user, from among subjects the face of which is registered in the imaging apparatus 101. In a state where a subject having a high priority is being detected, the image capturing score is more likely to reach 2,000 points, and, as a result, the frequency of image capturing is likely to increase.

For example, when a smile of the subject is recognized, 800 points are added to the score. This smile-based point addition is performed even for a subject not having a high priority. The present exemplary embodiment will be described below centering on an example case where the points for the smile-based point addition are the same regardless of whether the subject has a high priority. However, the present disclosure is not limited thereto. For example, the points to be added upon detection of a smile of a subject having a high priority may be higher than the points to be added upon detection of a smile of a subject not having a high priority. Adding points in this way enables performing image capturing closer in line with the user's intention. The automatic image capturing is performed when the score exceeds 2,000 points as a result of the point addition due to these facial expression (emotional) changes of the subject. Even if the score does not exceed 2,000 points by the point addition due to a facial expression change, the score reaches 2,000 points in a shorter time period by the point addition due to the subsequent passage of time.

The point addition due to the passage of time will be described below centering on an example case where points are linearly added over time, for example, the score reaches 2,000 points in 120 seconds, i.e., 2,000/120 points are added to the score per second. However, the present disclosure is not limited thereto. As another example of a point addition method, no points may be added to the score until the timing of 110 seconds out of 120 seconds, and 200 points may be added to the score per second in subsequent 10 seconds (the timing from 110 to 120 seconds). Increasing the image capturing score in this way enables preventing the image capturing score from reaching an image capturing trigger point regardless of the degree of priority in the point addition due to a facial expression change of the subject. In the point addition method for linearly increasing the image capturing score over the passage of time, points have already been added over the passage of long time. In this case, therefore, the image capturing score often reaches the image capturing trigger point even with the point addition due to a facial expression change to a smile of a subject having a low priority, and hence the degree of priority is comparatively hard to be reflected. On the other hand, in the case of the low point addition due to a facial expression change, the timing of a facial expression change may be missed. Since this point addition method needs to be avoided, no points are added to the score until the timing of 110 seconds. With this point addition method, no points are added to the score of the subject having a low priority until the timing of 110 seconds. On the other hand, since 1,000 points are added to the score upon detection of a subject having a high priority, at least 1,000 points are added to the score even if the point addition due to the passage of time is not performed until the timing of 110 seconds.

In this way, a subject having a low priority can be less likely to make the score reach the image capturing trigger point than a subject having a high priority when the point addition due to a facial expression change is performed, allowing the degree of priority to function to a further extent. Although the point addition due to a facial expression change has been described above as an example, the criterion of the point addition is not limited thereto. Other examples of point addition criteria include a timing when the voice becomes louder and a timing when the body language becomes larger. To allow the degree of priority to function for these criteria, the above-described difference in the point addition method needs to be provided.

Even if the image capturing score does not exceed 2,000 points by the action of the subject, the image capturing is performed at the timing of 120 seconds over the passage of time. This means that there is no possibility that the image capturing is not performed at all for a certain period of time.

If a subject is detected during the point addition, the timing to start increasing the image capturing score may be brought earlier out of 120 seconds. More specifically, when a subject having a high priority is detected at the timing of 60 seconds, for example, 1,000 points are added to the score but the image capturing score does not exceed 2,000 points. In this case, however, the first control unit 223 may start linearly increasing the image capturing score when 30 seconds have elapsed since the subject was detected, instead of adding no points until the timing of 110 seconds. Alternatively, the first control unit 223 may start linearly increasing the image capturing score not at 10 seconds but at 20 seconds before the timing of 120 seconds. Increasing the image capturing score in this way increases the possibility that a subject having a high priority is captured, making it easier to achieve image capturing according to the user's intention.

When the automatic image capturing is performed, the image capturing score is reset to 0 points. The automatic image capturing is not performed until the image capturing score exceeds 2,000 points again.

The determination of whether to perform the automatic image capturing is performed as described above. If the first control unit 223 determines to perform the automatic image capturing (YES in step S507), the processing proceeds to step S508. On the other hand, if the first control unit 223 determines not to perform the automatic image capturing (NO in step S507), the processing returns to step S501.

In step S508, the first control unit 223 performs the image capture processing. The image capture processing includes, for example, still image capturing and moving image capturing.

The automatic image capture processing of the imaging apparatus 101 according to the present exemplary embodiment has been described above. The above-described processing for automatically capturing an image of a subject enables the imaging apparatus 101 to capture a still or moving image of the scene intended by the user without an image capture instruction from the user.

<Speech Recognition Processing>

Figure 7:
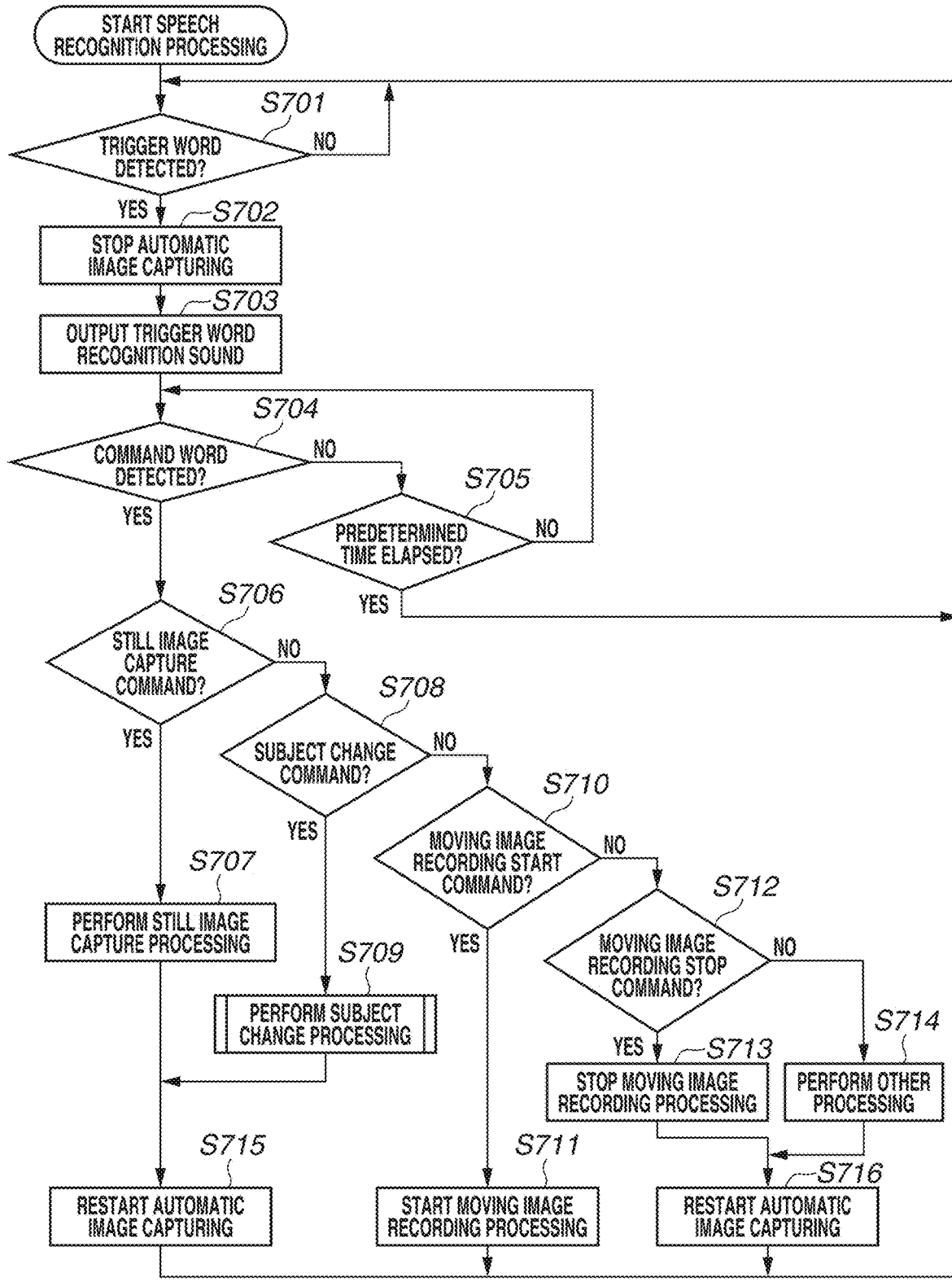
FIG. 7 is a flowchart illustrating speech recognition processing according to the first exemplary embodiment.

FIG. 7 is a flowchart illustrating the speech recognition processing of the imaging apparatus 101 according to the present exemplary embodiment.

The processing of the flowchart is started when the audio input/audio processing unit 409 detects an audio signal input from a microphone. The processing of the flowchart is performed in parallel with the automatic image capture processing in FIG. 5. The present exemplary embodiment will be described below centering on an example where the flowchart is started when the audio input/audio processing unit 409 detects an audio signal input from a microphone during execution of the automatic image capture processing in FIG. 5. This processing is implemented when the first control unit 223 executes a program recorded in the nonvolatile memory 216.

In step S701, the first control unit 223 determines whether a trigger word has been detected. The trigger word refers to an activation command for starting audio command recognition in which a specific audio instruction is issued to the imaging apparatus 101. When the user issues an audio instruction to the imaging apparatus 101, the user utters a command word following the trigger word to instruct the imaging apparatus 101 to recognize the command word. In a case where the trigger word is detected (YES in step S701), the processing proceeds to step S702. On the other hand, in a case where the trigger word is not detected (NO in step S701), the first control unit 223 repeats the processing in step S701 until the trigger word is detected.

In step S702, the first control unit 223 stops the automatic image capture processing. According to the present exemplary embodiment, when the first control unit 223 detects the trigger word, the first control unit 223 enters a command word wait state and stops the automatic image capture processing. Stopping the automatic image capture processing refers to, for example, suspending the execution of the subject search using the pan, tilt, and zoom drive or the image capture processing. The purposes of stopping the automatic image capturing include reducing the processing load and quickly responding to a command word instruction to be issued following the trigger word by the user. The purposes of stopping the automatic image capturing also include enabling image capturing in the direction intended by the user. For example, when the user is making an attempt to issue an image capture instruction by using an audio instruction, it is assumed that the user utters a trigger word at the timing of image capturing intended by the user. However, if the first control unit 223 does not stop the automatic image capturing even after the imaging apparatus 101 detects the trigger word, a certain cause is assumed. More specifically, by the time of the reception of the command word as an image capture instruction following the trigger word, the imaging direction of the imaging apparatus 101 would have changed from the one when the trigger word was received. More specifically, if the first control unit 223 does not stop the automatic image capturing even upon detection of the trigger word, it is difficult to perform image capturing in the direction according to the user's intention. Therefore, the imaging apparatus 101 stops the pan and tilt drive upon detection of the trigger word. This enables maintaining the state where the imaging apparatus 101 is oriented toward the image capture direction intended by the user.

In step S703, the first control unit 223 outputs a detection sound for notifying the user of the detection of the trigger word.

In step S704, the first control unit 223 determines whether the command word is detected following the trigger word. If the command word is detected (YES in step S704), the processing proceeds to step S706. On the other hand, if the command word is not detected (NO in step S704), the processing proceeds to step S705.

In step S705, the first control unit 223 determines whether a predetermined time has elapsed since a trigger word was detected and the command word wait mode was entered. If the predetermined time has elapsed (YES in step S705), the processing returns to step S701. In step S701, the first control unit 223 exits the command word wait state and enters the trigger word wait state. In this case, the first control unit 223 also restarts the automatic image capture processing. On the other hand, if the predetermined time has not elapsed (NO in step S705), the processing returns to step S704. In step S704, the first control unit 223 repeats the processing until a command word is detected.

In step S706, the first control unit 223 determines whether the detected command word is a still image capture command. This still image capture command is used to instruct the imaging apparatus 101 to perform image capture processing and recording processing on a still image. In a case where the detected command is determined to be a still image capture command (YES in step S706), the processing proceeds to step S707. On the other hand, in a case where the detected command is determined to be not a still image capture command (NO in step S706), the processing proceeds to step S708.

In step S707, the first control unit 223 performs still image capture processing. More specifically, the image processing unit 207 converts the signal captured by the imaging unit 206 into the JPEG format, and the image recording unit 208 records the signal in the recording medium 221.

In step S708, the first control unit 223 determines whether the detected command word is a subject change command. The subject change command is, for example, a keyword "Capture other persons". In a case where the detected command is determined to be the subject change command (YES in step S708), the processing proceeds to step S709. On the other hand, in a case where the detected command is determined to be not the subject change command (NO in step S708), the processing proceeds to step S710.

In step S709, the first control unit 223 performs subject change processing. Immediately before the execution of this step, the first control unit 223 is capturing an image of a subject. The subject change processing will be described in detail below.

In step S710, the first control unit 223 determines whether the detected command is a moving image recording start command. The moving image capture command is a command for instructing the imaging apparatus 101 to perform moving image capture processing and recording processing. If the detected command is determined to be the moving image recording start command (YES in step S710), the processing proceeds to step S711. On the other hand, if the detected command is determined to be not the moving image recording start command (NO in step S710), the processing proceeds to step S712.

In step S711, the first control unit 223 starts moving image capturing by using the imaging unit 206 and records the captured moving image data in the recording medium 221. During moving image data recording, the first control unit 223 keeps maintaining the automatic image capturing stop state without performing the subject search.

In step S712, the first control unit 223 determines whether the detected command word is a moving image recording stop command. If the detected command is determined to be the moving image recording stop command (YES in step S712), the processing proceeds to step S713. On the other hand, if the detected command is determined to be not the moving image recording stop command (NO in step S712), the processing proceeds to step S714.

In step S713, the first control unit 223 stops the subject image capturing by the imaging unit 206 and the moving image data recording to the recording medium 221 to complete the moving image data recording.

In step S714, the first control unit 223 performs processing corresponding to other command words. For example, the first control unit 223 performs processing for the command word for instructing the imaging apparatus 101 to perform the pan and tilt drive in the direction specified by the user, and processing for the command word for instructing the imaging apparatus 101 to change various imaging parameters such as exposure correction for the imaging apparatus 101.

In steps S715 and S716, the first control unit 223 performs processing for restarting the automatic image capturing that stopped in step S702. For example, the first control unit 223 starts the processing of the flowchart illustrated in FIG. 5 from the processing in step S502.

The speech recognition processing of the imaging apparatus 101 according to the present exemplary embodiment has been described.

The subject change processing in step S709 in FIG. 7 will now be described.

<Subject Change Processing>

Figure 8:
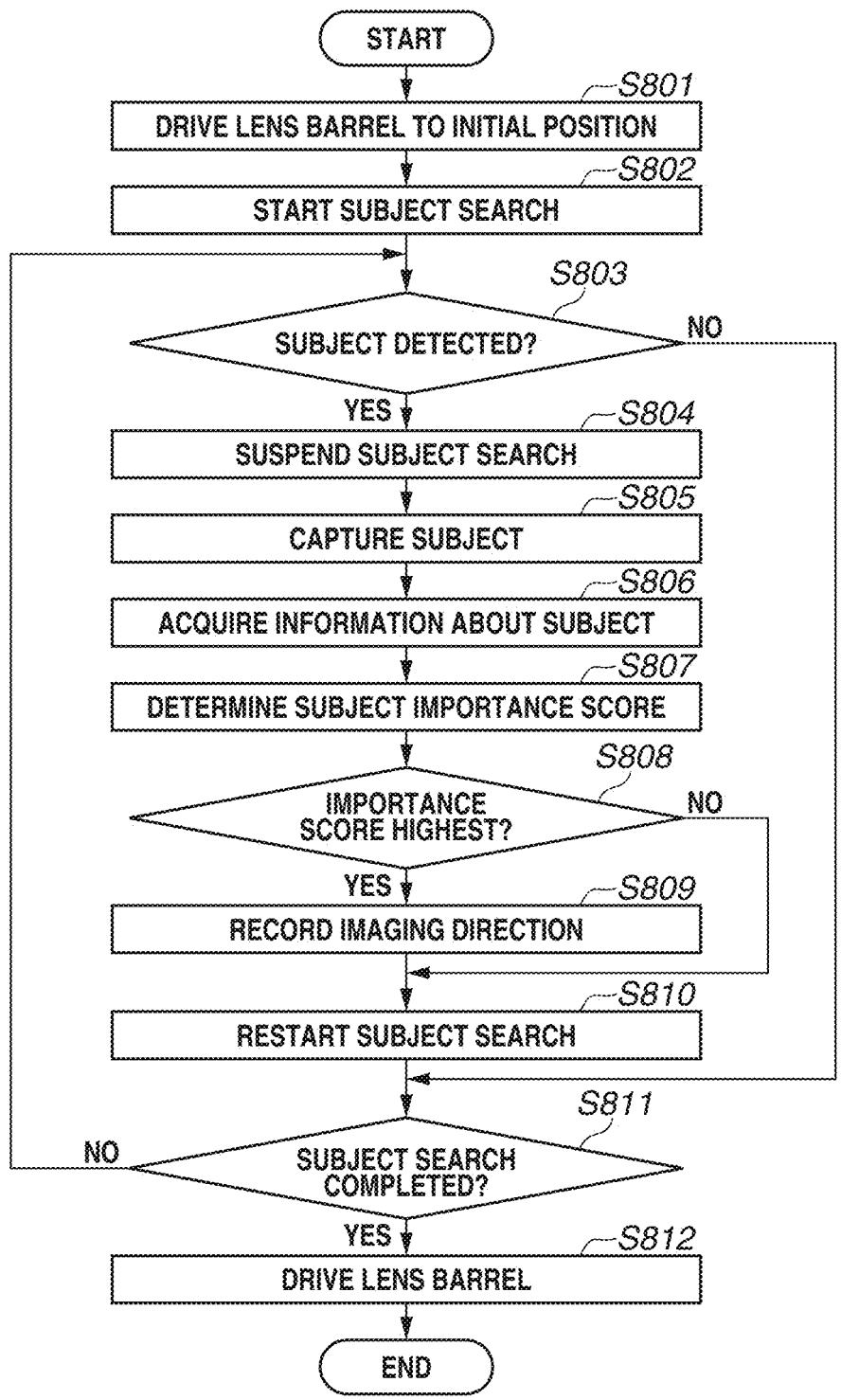
FIG. 8 is a flowchart illustrating subject change processing according to the first exemplary embodiment.

FIG. 8 is a flowchart illustrating the subject change processing according to the present exemplary embodiment. Processing of each step in this flowchart is implemented when the first control unit 223 executes a program stored in the nonvolatile memory 216. Processing of each step in the following flowcharts is implemented when the first control unit 223 controls each unit of the imaging apparatus 101. Processing of this flowchart is equivalent to the processing in step S709 of the flowchart in FIG. 7.

In step S801, the first control unit 223 controls the drive of the tilt rotation unit 104 and the pan rotation unit 105 via the lens barrel rotation drive unit 205 to drive the imaging direction of the lens barrel 102 to the direction to be the initial position of the subject search. Processing for determining the direction to be the initial position of the subject search will be described below with reference to FIG. 9. In the description of this flowchart, the direction to be the initial position is the direction resulting from the rightward rotation by 180 degrees from the direction of the axis 1301 in FIG. 6C.

In step S802, the first control unit 223 starts the subject search when the imaging direction of the lens barrel 102 is oriented toward the direction to be the initial position. In the subject search, the first control unit 223 controls the drive of the tilt rotation unit 104 and the pan rotation unit 105 via the lens barrel rotation drive unit 205 so that the imaging direction of the lens barrel 102 is oriented toward the direction to be the end position of the subject search. In the description of this flowchart, the direction to be the end position is the direction resulting from the leftward rotation by 180 degrees from the direction of the axis 1301 in FIG. 6C. More specifically, in the description of this flowchart, the imaging direction of the lens barrel 102 is controlled to go around once in the clockwise direction along a plane parallel to the horizontal plane. Processing in steps S803 to S811 following this step is processing in the subject search.

In step S803, the first control unit 223 determines whether a subject has been detected by the subject detection unit 225. If a subject is determined to have been detected (YES in step S803), the processing proceeds to step S804. On the other hand, if no subject is determined to have been detected (NO in step S803), the processing proceeds to step S811.

In step S804, the first control unit 223 suspends the subject search. For example, the first control unit 223 suspends the drive of the tilt rotation unit 104 and pan rotation unit 105.

In step S805, the first control unit 223 captures the subject detected in step S803. The first control unit 223 records the captured image data in the recording medium 221.

In step S806, the first control unit 223 acquires information about the captured subject. Examples of the information about the subject include whether the face of the subject is registered in the imaging apparatus 101, the priority of the subject, and the face of the subject.

In step S807, the first control unit 223 determines the importance score of the subject based on the information about the subject acquired in step S806. The importance score refers to a parameter used by the first control unit 223 to determine the subject to be captured after completion of the search for changing the subject. The importance score is different from the importance level for determining the search area. For example, a subject set as a subject having a high priority by the user can be estimated to be the subject the user wants to capture. Accordingly, this subject has a relatively high importance score. On the contrary, a subject not registered in the imaging apparatus 101 is not necessarily the subject the user wants to capture. Accordingly, this subject has a relatively low importance score. If a subject registered in the imaging apparatus 101 has no priority setting, the subject has an intermediate importance score. More specifically, the first control unit 223 can determine a subject having a high importance score as the subject the user wants to capture.

According to the present exemplary embodiment, the first control unit 223 determines the importance score of a subject with a facial expression to be higher than the importance score of a subject with a straight face. For example, the importance score of a subject with a smile is higher than the importance score of a subject with a straight face. For example, a tearful face of a child is likely to be an expression the child's parent wants to capture. Accordingly, the first control unit 223 sets the importance score of a subject with a tearful face to be higher than the importance score of a subject with a straight face.

According to the present exemplary embodiment, the first control unit 223 determines the importance score also based on the size of the eyes of the detected subject. For example, the first control unit 223 determines the importance score of a subject the eyes of which are detected, to be higher than the importance score of a subject the eyes of which cannot be recognized because of eyes closure. For example, the first control unit 223 determines the importance score of a subject with the open eyes to be higher than the importance score of a subject with relatively small detected eyes, such as half eyes. According to the present exemplary embodiment, in this way, the first control unit 223 determines the importance score based on the size of the detected eyes of the subject.

According to the present exemplary embodiment, the first control unit 223 determines the importance score also based on the orientation of the face of a subject. For example, the first control unit 223 determines the importance score of the subject the front face of which is entirely detected, to be higher than the importance score of a subject the face of which is partially detected, such as a side face.

According to the present exemplary embodiment, the first control unit 223 determines the final importance score of the subject by calculating the sum of the importance scores for these pieces of information about the subject. According to the present exemplary embodiment, the first control unit 223 determines the importance score of a subject having a high priority to be higher than the importance scores of other subjects without the priority setting. More specifically, a subject having a high priority and another subject without the priority setting are detected, the first control unit 223 determines the subject having a high priority as the subject to be captured after completion of the subject change processing.

In step S808, the first control unit 223 determines whether the importance score of the subject determined in step S807 is the highest of the importance scores determined since the processing of this flowchart was started. For example, the first control unit 223 determines whether the importance score is the highest of the importance scores determined since the processing of this flowchart was started. In a case where the importance score is determined to be the highest (YES in step S808), the processing proceeds to step S809. On the other hand, in a case where the importance score is determined to be not the highest (NO in step S808), the processing proceeds to step S810.

In step S809, the first control unit 223 records the imaging direction of the lens barrel 102 at the time of the detection of the subject determined to have the highest importance score in step S808. For example, the first control unit 223 records the angle of the pan direction in the memory 215 as the imaging direction of the lens barrel 102. According to the present exemplary embodiment, the reference direction of the imaging apparatus 101 (the direction of the axis 1301 illustrated in FIG. 6C) is recorded in the memory 215 as the initial value of the imaging direction of the lens barrel 102. The first control unit 223 also records the information about the subject in the memory 215 together with the imaging direction of the lens barrel 102. In a case where the imaging direction of the lens barrel 102 and the information about the subject have already been recorded, the first control unit 223 overwrites the imaging direction of the lens barrel 102 and the information about the subject.

In step S810, the first control unit 223 restarts the subject search. For example, the first control unit 223 restarts the drive by the tilt rotation unit 104 and the pan rotation unit 105.

In step S811, the first control unit 223 determines whether the subject search is completed. For example, the first control unit 223 determines whether the imaging direction of the lens barrel 102 is oriented toward the direction to be the end position. In a case where the imaging direction is oriented toward the direction to be the end position, the first control unit 223 determines that the subject search is completed. On the other hand, in a case where the imaging direction is not oriented toward the direction to be the end position, the first control unit 223 determines that the subject search is not completed. If the subject search is determined to have been completed (YES in step S811), the processing proceeds to step S812. On the other hand, if the subject search is determined to have not been completed (NO in step S811), the processing returns to step S803. In step S803, the first control unit 223 continues the subject search. Since the end position is the same as the direction to be the initial position as described above in the description of step S802, the processing of this step is the same as processing for determining whether the imaging direction of the lens barrel 102 has gone around once since the subject search was started. As described above in the description of step S805, in a case where a subject is detected during the subject search, the first control unit 223 captures an image of the detected subject and then records information about the subject. More specifically, in a case where the subject search is determined to have been completed in this step, the first control unit 223 performs the subject search for the entire circumference to change the subject, captures an image of each of circumferentially existing subjects, and records the images. This enables the imaging apparatus 101 to capture, at least once, an image of a subject the user desires to be captured. The subject to be captured includes the person who issued a subject change instruction via an audio input. When the processing in step S809 is repeated, the information about the subject determined to have the highest importance score from among the subjects appearing in the entire circumference is recorded in the memory 215.

In step S812, the first control unit 223 controls the drive of the tilt rotation unit 104 and the pan rotation unit 105 via the lens barrel rotation drive unit 205 to capture an image of the subject determined to have the highest importance score. More specifically, the first control unit 223 controls the drive of these units so that the imaging direction of the lens barrel 102 is the imaging direction at the time of the detection of the subject determined to have the highest score in step S808. The first control unit 223 also determines the subject to be captured, based on the information about the subject recorded last in step S809. Following the processing in this step, the first control unit 223 performs processing for capturing an image of the subject. The processing for capturing an image of the subject will be described below with reference to FIG. 10.

If no subject is detected in the subject change processing, the first control unit 223 performs the automatic image capture processing. If no subject is detected in the subject change processing, it is assumed that no subject exists around the imaging apparatus 101. At the same time, it is assumed that the user wants the imaging apparatus 101 to capture an image of a subject since the user issued a subject change instruction.

Thus, the first control unit 223 performs the automatic image capture processing. If a new subject comes near the imaging apparatus 101, the first control unit 223 immediately detects the subject and captures an image of the subject. This enables the first control unit 223 to shorten the time period during which no subject is captured, and automatically perform image capturing according to the user's intention. If no subject is detected in the subject change processing, the processing in step S809 is not performed. Accordingly, the reference direction of the imaging apparatus 101 recorded in the memory 215 is not overwritten. Thus, in step S812, the imaging apparatus 101 is oriented toward the reference direction of the imaging apparatus 101. Then, after the imaging apparatus 101 is oriented toward the reference direction of the imaging apparatus 101, the first control unit 223 performs the automatic image capture processing.

The subject change processing of the imaging apparatus 101 according to the present exemplary embodiment has been described above.

In the subject change processing of the imaging apparatus 101 according to the present exemplary embodiment, the imaging apparatus 101 searches for subjects existing around the imaging apparatus 101. For example, even if the imaging apparatus 101 is tracking a subject the user does not want to capture, the user can issue an instruction as a trigger for canceling the tracking and searching for another subject.

The imaging apparatus 101 also receives an instruction without specific designation of a change destination imaging target from the user, such as "Capture other persons", and searches for another subject while maintaining the automatic image capturing properties. The user can instruct the imaging apparatus 101 to capture an image of a desired subject simply by issuing a subject change instruction, eliminating the need of specifying the position and name of the desired imaging target.

The first control unit 223 may perform the subject change processing upon reception of a subject change instruction from the smart device 301. In this case, when the user operates a dedicated application on the smart device 301, the smart device 301 transmits a control signal for changing the subject to the imaging apparatus 101. Then, the first control unit 223 starts the subject change processing upon reception of the control signal.

Although, in the present exemplary embodiment, the first control unit 223 searches for a subject over the entire circumference of the imaging apparatus 101 to change the subject, the search range may be narrowed. For example, when the imaging apparatus 101 is installed at a corner of a room, the first control unit 223 may search for a subject in a range other than the ranges close to the walls of the room in the subject change processing. For example, when the image capture range of the imaging apparatus 101 is limited to 180 degrees, the first control unit 223 performs the subject search in the limited range in the subject change processing. Thus, in the subject change processing, the first control unit 223 may search for a subject based on the status of the periphery of the imaging apparatus 101 and a preset image capture range.

Figure 9:
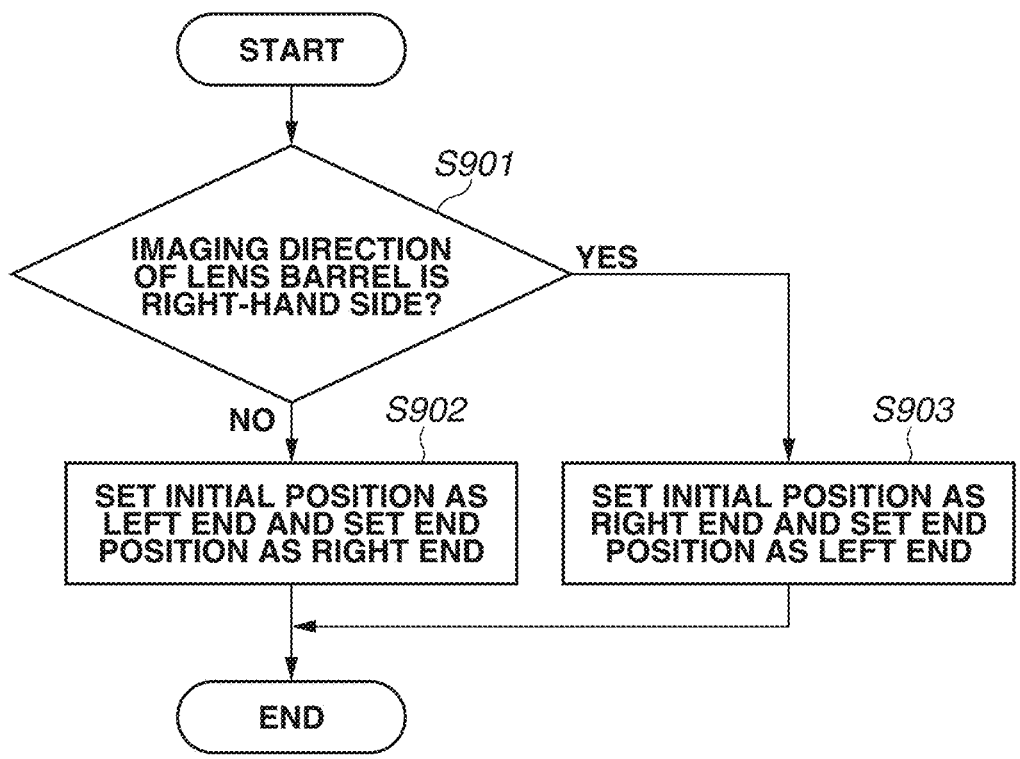
FIG. 9 is a flowchart illustrating processing for determining an initial position of subject search processing according to the first exemplary embodiment.

FIG. 9 is a flowchart illustrating processing for determining the direction to be the initial position of the subject search in the subject change processing according to the present exemplary embodiment. Processing of each step in this flowchart is implemented when the first control unit 223 executes a program stored in the nonvolatile memory 216. Processing of each step in the following flowcharts is implemented when the first control unit 223 controls each unit of the imaging apparatus 101. Processing of this flowchart is equivalent to the processing in step S801 of the flowchart in FIG. 8.

In step S901, the first control unit 223 determines whether the current imaging direction of the lens barrel 102 is the right-hand side or the left-hand side of the center direction. Referring to FIG. 6C, for example, the center direction refers to the direction of the axis 1301, the right-hand side refers to the 180-degree range in the clockwise direction from the direction of the axis 1301, and the left-hand side refers to the 180-degree range in the counterclockwise direction from the direction of the axis 1301. In this case, the direction to be the right end and the direction to be the left end are overlapped. The right end may be set to an arbitrary direction within the 180-degree range in the clockwise direction from the center direction. Likewise, the left end may be set to an arbitrary direction within the 180-degree range in the counterclockwise direction from the center direction.

In a case where the current imaging direction of the lens barrel 102 is determined to be the left-hand side (NO in step S901), the processing proceeds to step S902. In step S902, the first control unit 223 sets the initial position of the subject search as the left end and sets the end position thereof as the right end. In this case, the first control unit 223 controls the lens barrel rotation drive unit 205 to perform the subject search by rotating in the clockwise direction from the left end.

On the other hand, when the current imaging direction of the lens barrel 102 is determined to be the right-hand side (YES in step S901), the processing proceeds to step S903. In step S903, the first control unit 223 sets the initial position of the subject search as the right end and sets the end position thereof as the left end. In this case, the first control unit 223 controls the lens barrel rotation drive unit 205 to rotate the subject search in the counterclockwise direction from the right end.

The processing for determining the direction to be the initial position of the subject search in the subject change processing according to the present exemplary embodiment has been described.

In this way, the first control unit 223 sets the direction to be the initial position of the subject search in the subject change processing to a direction with a small rotational angle in the pan direction.

In step S801, the imaging apparatus 101 may determine the direction to be the initial position of the subject change processing regardless of the current imaging direction of the lens barrel 102. For example, the imaging apparatus 101 determines the direction to be the initial position in the subject change processing as the direction to be the right end. In this case, the imaging apparatus 101 determines the direction to be the initial position in the subject change processing as the direction to be the left end.

The imaging apparatus 101 may recognize an instruction for changing the imaging direction of the imaging apparatus 101 as a subject change command, such as "Look at the right" and "Look at the left". When such a command is employed, the user needs to grasp the position of the subject the user wants to capture before issuing an instruction. However, the search range of the imaging apparatus 101 can be limited to the desired direction of the subject, making it possible to more efficiently change the subject.

When recognizing a change instruction for changing the imaging direction of the imaging apparatus 101, such as "Look at the right" and "Look at the left", as a subject change command, the first control unit 223 recognizes the direction to be the initial position of the subject search as the direction when a subject change command is recognized. Then, the first control unit 223 performs the subject search processing in the direction included in the change instruction. In this case, the end position of the subject search processing is the end in the direction included in the change instruction. For a change instruction "Look at the right", for example, the end (the end position of the subject search processing) is the right end. For a change instruction "Look at the left", for example, the end (the end position of the subject search processing) is the left end.

<Image Capture Processing After Subject Change>

The image capture processing after the subject change will now be described.

Figure 10:
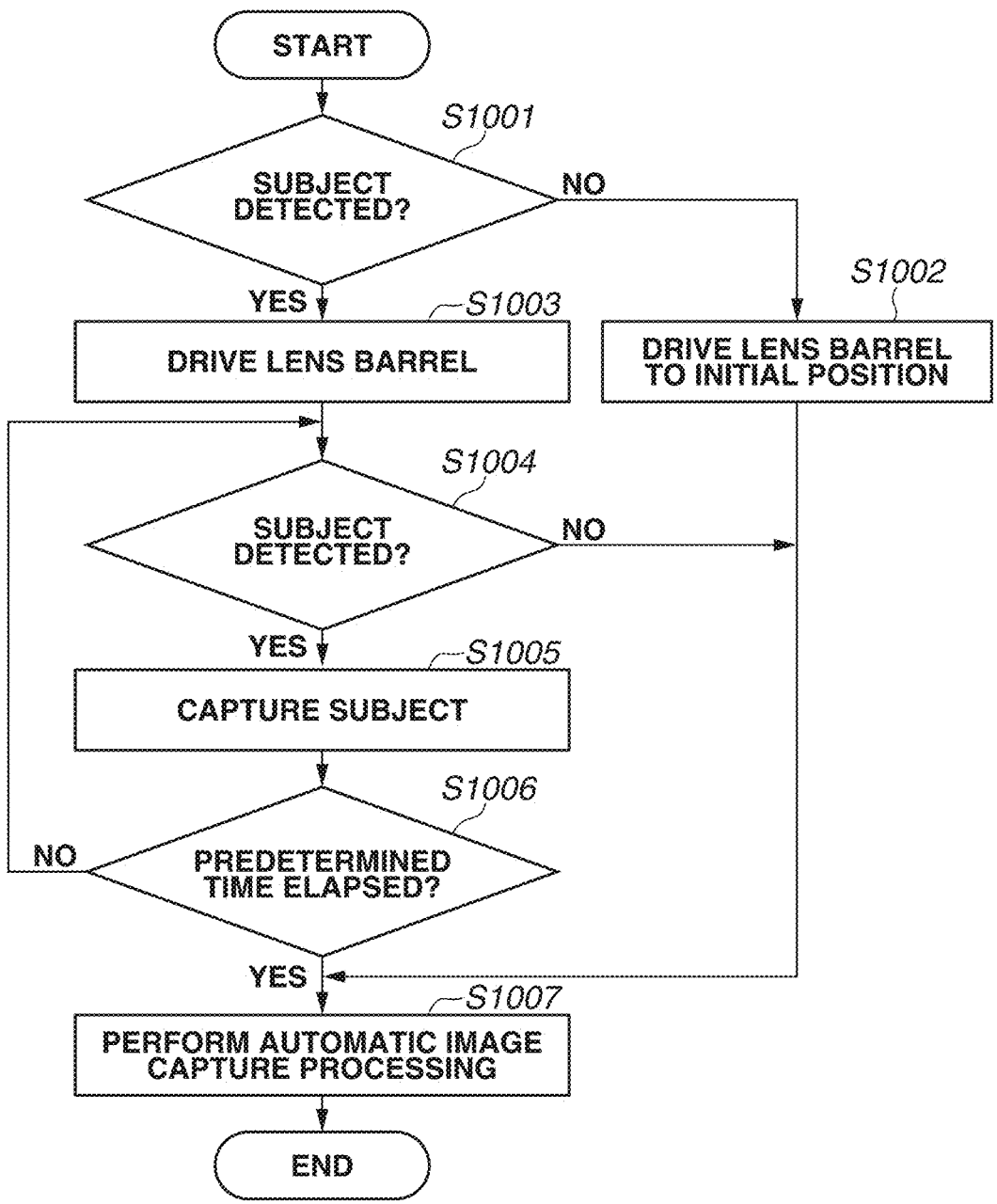
FIG. 10 is a flowchart illustrating image capture processing after subject change according to the first exemplary embodiment.

FIG. 10 is a flowchart illustrating the image capture processing after the subject change according to the present exemplary embodiment. Processing of this flowchart is executed following step S812. Processing of each step in this flowchart is implemented when the first control unit 223 executes a program stored in the nonvolatile memory 216.

In step S1001, the first control unit 223 determines whether a subject has been detected in the above-described subject change processing. In a case where a subject is determined to have been detected (YES in step S1001), the processing proceeds to step S1003. On the other hand, in a case where no subject is determined to have been detected (NO in step S1001), the processing proceeds to step S1002.

In step S1002, the first control unit 223 controls the lens barrel rotation drive unit 205 to drive the lens barrel 102 to the initial position. For example, this initial position is the direction to be the initial position of the subject search.

In step S1003, the first control unit 223 controls the lens barrel rotation drive unit 205 so that the imaging direction of the lens barrel 102 is oriented toward the imaging direction recorded in step S809 in FIG. 8.

Subsequently, the first control unit 223 limits the imaging direction to a range that includes the imaging direction recorded in step S809 and is narrower than the subject search range in the subject search processing until the processing in step S1007 is started. Accordingly, the first control unit 223 can keep fitting the subject captured in the subject change processing into the field angle as the main subject. Setting the range in the imaging direction in this way enables the first control unit 223 to perform image capturing while adjusting the field angle to obtain a preferable composition.

In step S1004, the first control unit 223 determines whether the subject determined to have the highest importance score in step S812 has been detected in the imaging direction recorded in step S809 in FIG. 8. If the first control unit 223 determines that the subject determined to have the highest importance score has been detected (YES in step S1004), the processing proceeds to step S1005. On the other hand, if the first control unit 223 determines that the subject determined to have the highest importance score has not been detected (NO in step S1004), the processing proceeds to step S1007.

In step S1005, the first control unit 223 captures an image of the subject detected in step S1004 and then records imaging data in the recording medium 221.

In step S1006, the first control unit 223 determines whether a predetermined time period has elapsed since the processing in step S1004 was performed. The predetermined time period is, for example, 5 or 10 minutes. In a case where the predetermined time period is determined to have not elapsed (NO in step S1006), the processing returns to step S1004. In step S1004, the first control unit 223 continues detecting a subject having the highest importance score determined in step S812. On the other hand, in a case where the predetermined time period is determined to have elapsed (YES in step S1006), the processing proceeds to step S1007.

In step S1007, the first control unit 223 stops detecting a subject determined to have the highest importance score in the imaging direction recorded in step S809 in FIG. 8, and returns to the normal automatic image capture processing. In addition, the first control unit 223 resets the imaging direction recorded in step S809 in FIG. 8 and the limitation on the range in the imaging direction from the processing in step S1003. More specifically, the reference direction is overwritten to the memory 215, and the subject search range returns to 360 degrees in the automatic image capture processing following the processing in step S1007. As a result of performing the automatic image capture processing, the first control unit 223 may continue capturing an image of a subject determined to have the highest importance score, currently being captured.

The image capture processing of the imaging apparatus 101 after the subject change has been described above.

In this way, the first control unit 223 performs the subject search upon reception of a subject change instruction from the user, and then captures an image of the subject determined to have the highest importance score. This enables the imaging apparatus 101 to continue capturing an image of a subject estimated to be the subject the user wants to capture.

Although, in this flowchart, the first control unit 223 determines whether a predetermined time period has elapsed in step S1006, the first control unit 223 may determine whether image capturing has been performed a predetermined number of times. For example, the predetermined number of times is 5 or 10. In a case where the first control unit 223 determines that the image capturing has been performed the predetermined number of times (YES in step S1006), the processing proceeds to step S1007. On the other hand, in a case where the first control unit 223 determines that the image capturing has not been performed the predetermined number of times (NO in step S1006), the processing returns to step S1004.

As described above, the imaging apparatus 101 performs the subject search upon reception of a subject search instruction from the user, automatically detects the subject the user wants to capture, and captures an image of the subject. This enables the imaging apparatus 101 to implement the automatic image capturing according to the user's intention.

The present exemplary embodiment has been described above centering on a case where the first control unit 223 receives an instruction for performing the subject change processing in a state where the automatic image capture processing is being performed. However, the first control unit 223 may also receive an instruction for performing the subject change processing even in a state where the automatic image capture processing is not being performed. Even in this case, the first control unit 223 captures an image of a subject according to the image capture processing after the subject change, and then starts the automatic image capture processing. It is assumed that the user who issued the subject change instruction wants the imaging apparatus 101 to keep capturing an image of the subject detected in the subject change processing. Alternatively, in a case where the first control unit 223 receives the subject change instruction when the automatic image capture processing is not being performed, the first control unit 223 may not start the automatic image capture processing after capturing an image of a subject according to the image capture processing after the subject change. It is assumed that the user who issued the subject change instruction may want the imaging apparatus 101 to capture an image of the subject detected in the subject change processing to a certain extent, and may intend not to perform the subsequent automatic image capturing. Further, in a case where the first control unit 223 receives the subject change instruction when the automatic image capture processing is not being performed, the first control unit 223 may set whether to start the automatic image capture processing after capturing an image of a subject according to image capture processing after the subject change. The user issues an instruction for setting whether to start the automatic image capture processing from the smart device 301 to the imaging apparatus 101. This enables the imaging apparatus 101 to respond to whichever the user wants.

According to a second exemplary embodiment, the imaging apparatus 101 performs the subject change processing focusing on changing the subject to be captured. The present exemplary embodiment intends to make it easier for the user to capture an image of the subject the user wants to capture, by preferentially capturing an image of another subject over the subject being captured immediately before starting the subject change processing. The configurations of the imaging apparatus 101 and the smart device 301 are similar to those according to the first exemplary embodiment.

Figure 11:
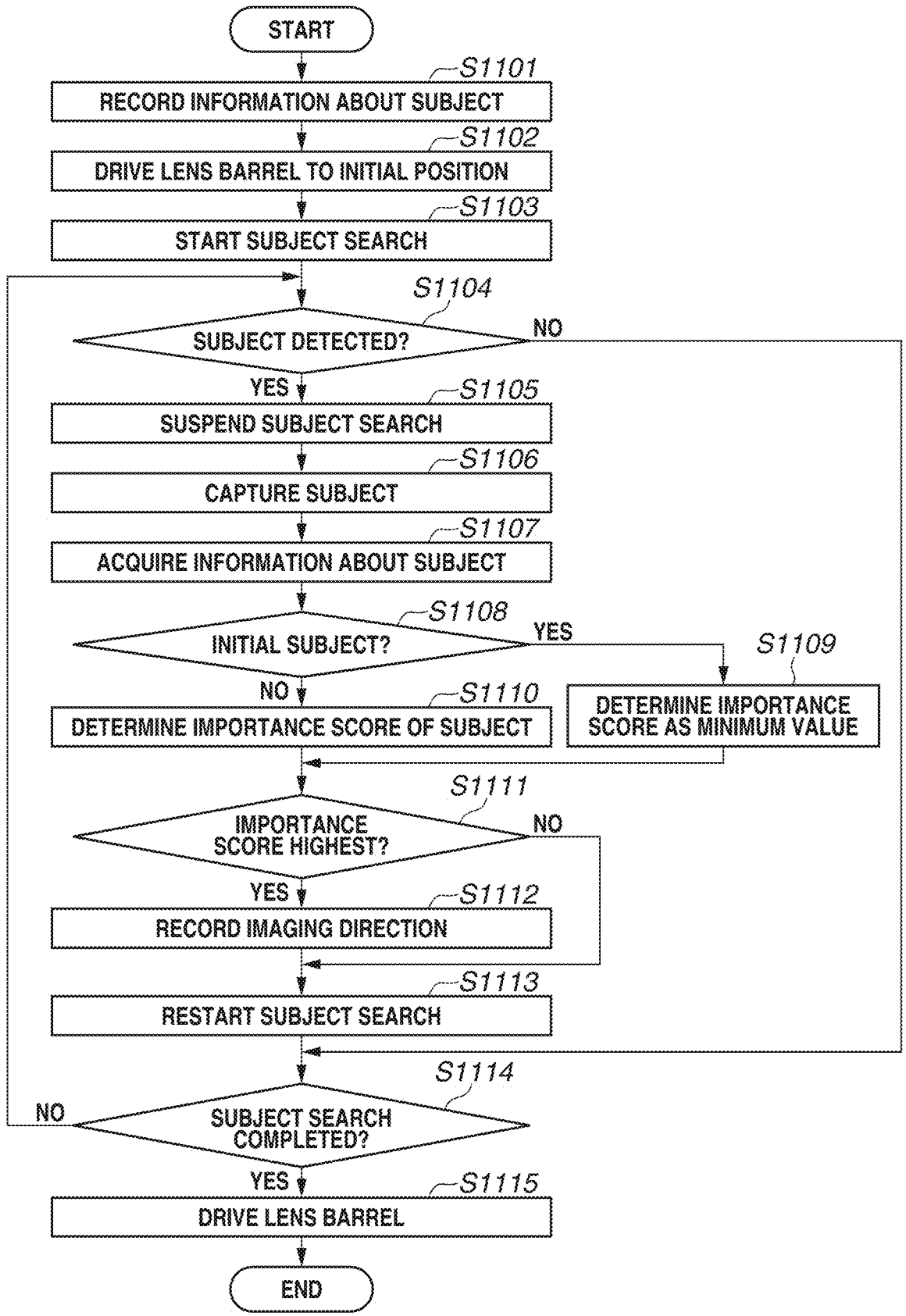
FIG. 11 is a flowchart illustrating subject change processing according to a second exemplary embodiment.

FIG. 11 is a flowchart illustrating the subject change processing according to the second exemplary embodiment. Processing of each step in the following flowcharts is implemented when the first control unit 223 controls each unit of the imaging apparatus 101. Processing of this flowchart is equivalent to the processing in step S709 of the flowchart in FIG. 7.

In step S1101, the first control unit 223 records the information about the subject currently being captured. For example, the first control unit 223 records the identifier indicating the subject being captured upon reception of a subject change instruction, as information about the subject. Hereinafter, the subject being captured in step S1101 is referred to as the initial subject. According to the present exemplary embodiment, the first control unit 223 selects only one initial subject. For example, when two different subjects are detected in the field angle, the first control unit 223 selects either one of the two subjects as the initial subject and then records the subject. In this case, the first control unit 223 selects the initial subject in consideration of criteria on initial subject selection, for example, largeness of the subject in the field angle, closeness of the subject to the center of the field angle, and the closeness of the subject to the in-focus point.

Processing in steps S1102 to S1107 is similar to the processing in steps S801 to S806 in FIG. 8, respectively, and thus redundant descriptions thereof will be omitted.

In step S1108, the first control unit 223 determines whether the subject detected in step S1104 is the initial subject. For example, the first control unit 223 detects whether the subject detected in step S1104 is the initial subject by referring to the identifier indicating the subject being captured upon reception of a subject search instruction, recorded in the information about the subject. In a case where the subject detected in step S1104 is determined to be the initial subject (YES in step S1108), the processing proceeds to step S1109. On the other hand, in a case where the subject detected in step S1104 is determined to be not the initial subject (NO in step S1108), the processing proceeds to step S1110.

In step S1109, the first control unit 223 determines the importance score of the subject detected in step S1104 as the minimum value. More specifically, in this step, the first control unit 223 determines the importance score of the initial subject to be lower than the importance scores of subjects other than the initial subject. For example, the first control unit 223 sets a negative fixed value that does not occur in the regular importance score calculation. Alternatively, the first control unit 223 sets a fixed value smaller than the minimum value of values that can be taken by the importance score calculated based on the priority, facial expression, size of the eyes, facial orientation, and other information.

More specifically, in this step, the first control unit 223 does not calculate the importance score. This enables the imaging apparatus 101 to capture images of subjects other than the initial subject after the subject change processing.

Processing in steps S1110 to S1115 is similar to the processing in steps S807 to S812 in FIG. 8, respectively, and redundant descriptions thereof will be omitted.

The subject change processing of the imaging apparatus 101 according to the present exemplary embodiment has been described.

In this way, the first control unit 223 can make it easier to capture images of subjects other than the initial subject in the subject change processing, by determining the importance score of the initial subject as the minimum value.

When the subject detected first is the initial subject in the subject change processing, the first control unit 223 records the orientation of the initial subject in the imaging direction recording processing in step S1112. This enables the first control unit 223 to capture an image of the initial subject even if a subject other than the initial subject is not found, making it possible to avoid a situation where no subject is captured after the subject change processing.

When the processing of flowchart in FIG. 11 ends, the first control unit 223 deletes the identifier indicating the subject being captured upon reception of a subject search instruction, recorded as information about the initial subject. When the first control unit 223 starts the following automatic image capture processing, the importance score of the initial subject is determined based on a similar criterion to other subjects.

Although, in the present exemplary embodiment, the first control unit 223 determines the importance score of the initial subject as the minimum value to capture images of subjects other than the initial subject, other methods for determining the importance score are also applicable. For example, the first control unit 223 may make it easier to capture images of subjects other than the initial subject by unconditionally adding a predetermined value to the importance scores of the subjects other than the initial subject.

According to a third exemplary embodiment, the imaging apparatus 101 captures a moving image during execution of the subject search processing in the subject change processing. The third exemplary embodiment is directed to enabling the imaging apparatus 101, by capturing a moving image in the subject change processing, to more reliably capture an image of the subject the user wants to capture than a case where a still image is captured in the subject change processing. The configurations of the imaging apparatus 101 and the smart device 301 are similar to those according to the first exemplary embodiment.

FIG. 12 is a flowchart illustrating the subject search processing according to the third exemplary embodiment. Processing of each step in this flowchart is implemented when the first control unit 223 executes a program stored in the nonvolatile memory 216. Processing of each step in the following flowcharts is implemented when the first control unit 223 controls each unit of the imaging apparatus 101. Processing of this flowchart is equivalent to the processing in step S709 of the flowchart in FIG. 7.

In step S1201, the first control unit 223 determines whether to capture a moving image or a still image in the subject change processing. For example, in the subject change processing, the first control unit 223 determines whether a still image or a moving image is set to be captured. The user can change this setting by using the smart device 301. In a case where a moving image is determined to be captured (YES in step S1201), the processing proceeds to step S1202. On the other hand, in a case where a still image is determined to be captured (NO in step S1201), the processing proceeds to step S1213. In step S1213, the first control unit 223 performs processing of the flowchart illustrated in FIG. 8.

In step S1202, the first control unit 223 controls the drive of the tilt rotation unit 104 and the pan rotation unit 105 via the lens barrel rotation drive unit 205 to drive the imaging direction of the lens barrel 102 to the direction to be the initial position of the subject search. For example, the first control unit 223 drives the tilt rotation unit 104 and the pan rotation unit 105 so that the imaging direction of the lens barrel 102 coincides with the direction of the axis 1301 in FIG. 6C.

In step S1203, the first control unit 223 starts recording a moving image.

In step S1204, the first control unit 223 starts the subject search when the imaging direction of the lens barrel 102 is oriented toward the direction to be the initial position (the direction of the axis 1301 in FIG. 6C). In the subject search, the first control unit 223 controls the drive of the tilt rotation unit 104 and the pan rotation unit 105 via the lens barrel rotation drive unit 205 so that the imaging direction of the lens barrel 102 is oriented toward the direction to be the end position of the subject search. According to the present exemplary embodiment, for example, the imaging direction of the lens barrel 102 is controlled to go around once in the clockwise direction along a plane parallel to the horizontal plane, from the direction of the axis 1301 in FIG. 6C. In this case, the direction of the end position of the subject search is the same as the initial position (the direction of the axis 1301 in FIG. 6C). Processing in steps S1205 to S1212 following this step is processing in the subject search.

In step S1205, the first control unit 223 determines whether a subject has been detected by the subject detection unit 225. If a subject is determined to have been detected (YES in step S1205), the processing proceeds to step S1206. On the other hand, if no subject is determined to have been detected (NO in step S1205), the processing proceeds to step S1210.

In step S1206, the first control unit 223 acquires information about the captured subject. Examples of the information about the subject include whether the face of the subject is registered in the imaging apparatus 101, the priority of the subject, the face of the subject, and whether the subject is the same as that captured upon reception of a subject change instruction.

In step S1207, the first control unit 223 determines the importance score of the subject based on the information about the subject acquired in step S1206. The importance score refers to a parameter used by the first control unit 223 to determine the subject to be captured after completion of the search for changing the subject. The importance score is different from the importance level for determining the search area. For example, a subject set as a subject having a high priority by the user can be estimated to be the subject the user wants to capture. Accordingly, this subject has a high importance score. On the contrary, a subject not registered in the imaging apparatus 101 is not necessarily the subject the user wants to capture. Therefore, this subject has a low importance score. If a subject registered in the imaging apparatus 101 has no priority setting, the subject has an intermediate importance score. More specifically, the first control unit 223 can determine a subject having a high importance score to be the subject the user wants to capture.

According to the present exemplary embodiment, the first control unit 223 determines the importance score of a subject with a facial expression to be higher than the importance score of a subject with a straight face. For example, the importance score of a subject with a smile is higher than the importance score of a subject with a straight face. For example, a tearful face of a child is likely to be an expression the child's parent wants to capture. Therefore, the first control unit 223 sets the importance score of a subject with a tearful face to be higher than the importance score of a subject with a straight face. According to the present exemplary embodiment, it is assumed that the importance score of a subject having a high priority is higher than the importance score of a subject with a facial expression such as a smile. According to the present exemplary embodiment, the first control unit 223 determines the importance score by calculating the sum of the importance scores for these pieces of information about the subject.

In step S1208, the first control unit 223 determines whether the importance score of the subject determined in step S1207 is the highest of the importance scores determined since the processing of this flowchart was started. For example, the first control unit 223 determines whether the importance score is the highest of the importance scores determined since the processing of this flowchart was started. If the importance score is determined to be the highest (YES in step S1208), the processing proceeds to step S1209. On the other hand, if the importance score is determined to be not the highest (NO in step S1208), the processing proceeds to step S1210.

In step S1209, the first control unit 223 records the imaging direction of the subject determined to have the highest importance score in step S1208. For example, the first control unit 223 records the angle of the pan direction in the memory 215 as the imaging direction of the lens barrel 102. According to the present exemplary embodiment, the initial value of the imaging direction when the processing of this flowchart is started is the direction to be the initial position of the subject search. The first control unit 223 also records the information about the subject in the memory 215 together with the imaging direction of the lens barrel 102. In a case where the imaging direction of the lens barrel 102 and the information about the subject have already been recorded, the first control unit 223 overwrites the imaging direction of the lens barrel 102 and the information about the subject.

In step S1210, the first control unit 223 determines whether the subject search is completed. For example, the first control unit 223 determines whether the imaging direction of the lens barrel 102 is oriented toward the direction to be the end position. If the imaging direction is oriented toward the direction to be the end position, the first control unit 223 determines that the subject search is completed. On the other hand, if the imaging direction is not oriented toward the direction to be the end position, the first control unit 223 determines that the subject search is not completed. If the subject search is determined to have been completed (YES in step S1210), the processing proceeds to step S1211. On the other hand, if the subject search is determined to have not been completed (NO in step S1210), the processing returns to step S1205. In step S1205, the first control unit 223 continues the subject search.

In step S1211, the first control unit 223 stops recording a moving image and records the moving image data in the recording medium 221.

In step S1212, the first control unit 223 controls the drive of the tilt rotation unit 104 and the pan rotation unit 105 via the lens barrel rotation drive unit 205 to capture an image of the subject determined to have the highest importance score. More specifically, the first control unit 223 controls the drive of these units so that the imaging direction of the lens barrel 102 coincides with the imaging direction at the time of the detection of the subject determined to have the highest score in step S808. The first control unit 223 also determines the subject to be captured, based on the information about the subject recorded last in step S1209. Following the processing in this step, the first control unit 223 performs processing for capturing an image of the subject. The processing for capturing an image of the subject is similar to the processing of the flowchart illustrated in FIG. 10 according to the first exemplary embodiment.

The subject change processing of the imaging apparatus 101 according to the present exemplary embodiment has been described.

By capturing a moving image in the subject change processing in this way, the imaging apparatus 101 can more reliably capture an image of the subject the user wants to capture than a case where a still image is captured in the subject change processing.

Other Exemplary Embodiments

The present disclosure can also be achieved when a program for implementing at least one of the functions according to the above-described exemplary embodiments is supplied to a system or apparatus via a network or storage medium, and at least one processor in a computer of the system or apparatus reads and executes the program. Further, the present disclosure can also be achieved by a circuit (for example, an application specific integrated circuit (ASIC)) for implementing at least one function.

The present disclosure is not limited to the above-described exemplary embodiments but the components can be modified and embodied without departing from the spirit and scope thereof upon implementation. Diverse inventions can be formed by suitably combining the plurality of components disclosed in the above-described exemplary embodiments. For example, some of the components may be deleted from overall components according to the exemplary embodiments. Further, the components of different exemplary embodiments may be suitably combined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-179541, filed Oct. 27, 2020, which is hereby incorporated by reference herein in its entirety.

What is claimed is:

1. An imaging apparatus comprising:
an imaging unit configured to capture an image of a subject;
a search unit configured to search for a subject which is an imaging target to be captured by the imaging unit; and
a reception unit configured to receive a change instruction for changing the imaging target from the subject currently being captured by the imaging unit without specifying a change destination imaging target,
wherein, in a case where the change instruction is received, the search unit searches for another subject,
wherein, in a search started upon reception of the change instruction, another subject is preferentially determined to be the imaging target over the subject which is the imaging target at the time of the reception of the change instruction,
wherein, in a case where the search unit detects no subject in a search for subject change started upon reception of the change instruction, automatic image capture processing is started,
wherein the automatic image capture processing is a processing to automatically determine whether to set the subject which has been the imaging target at the time of the reception of the change instruction and another subject to be the imaging target under the same criteria and to automatically capture an image of the determined imaging target, and
wherein the imaging unit, the search unit, and the reception unit are implemented by one or more processor.

2. The imaging apparatus according to claim 1, wherein, in a search started upon reception of the change instruction, an importance for each subject is calculated based on facial information for a detected subject, and the imaging target is determined based on the importance.

3. The imaging apparatus according to claim 2, wherein the importance of the subject is determined based on user-set priority, facial expression of the subject, size of the eyes of the subject, and facial orientation of the subject.

4. The imaging apparatus according to claim 2, wherein, in a search started upon reception of the change instruction, another subject to be the imaging target is preferentially determined by lowering the importance of the subject being captured at the time of the reception of the change instruction below the importance of another subject.

5. The imaging apparatus according to claim 1, wherein, in a case where the search is started upon reception of the change instruction, the search unit performs the search over an entire circumference of the imaging apparatus.

6. The imaging apparatus according to claim 1, further comprising a first recording unit configured to record an imaging direction of the imaging unit during the search by the search unit, wherein, in a case where the search started upon reception of the change instruction is completed, the imaging unit is oriented toward the direction recorded by the first recording unit.

7. The imaging apparatus according to claim 6, wherein, in a case where the subject is detected in the direction recorded by the first recording unit, the imaging unit repeats capturing an image of the subject until a predetermined time period has elapsed or until a predetermined number of images of the subject have been captured.

8. The imaging apparatus according to claim 6, wherein, in a case where the subject is not detected in the imaging direction recorded by the first recording unit, the search unit automatically starts a search for automatically capturing an image of the subject.

9. The imaging apparatus according to claim 1, wherein, in the search started upon reception of the change instruction, the imaging unit captures, upon detection of a subject, a still image of the detected subject.

10. The imaging apparatus according to claim 1, wherein, in the search started upon reception of the change instruction, the imaging unit captures a moving image.

11. The imaging apparatus according to claim 1, wherein, in the search started upon reception of the change instruction, the search unit orients an imaging direction of the imaging unit toward a predetermined direction different from the imaging direction of the imaging unit at a position at the time of the reception of the change instruction, and starts the search.

12. The imaging apparatus according to claim 11, wherein the search unit determines the predetermined direction according to the imaging direction of the imaging unit at the time of the reception of the change instruction.

13. The imaging apparatus according to claim 1, wherein the search unit determines a search range for searching for the subject according to the direction included in the change instruction from the position at the time of the reception of the change instruction.

14. The imaging apparatus according to claim 1, further comprising a microphone, wherein the reception unit receives the change instruction by analyzing an audio signal input from the microphone.

15. The imaging apparatus according to claim 1, further comprising a driving unit configured to drive an imaging direction of the imaging unit in search processing by the search unit.

16. A method for controlling an imaging apparatus, the control method comprising:
capturing an image of a subject;
searching for a subject which is an imaging target to be captured in the capturing;
receiving a change instruction for changing the imaging target without specifying a change destination imaging target; and
searching for another subject in a case where the change instruction is received,
wherein, in a search started upon reception of the change instruction, another subject is preferentially determined to be the imaging target over the subject which is the imaging target at the time of the reception of the change instruction,
wherein, in a case where no subject is detected in a search for subject change started upon reception of the change instruction, automatic image capture processing is started, and
wherein the automatic image capture processing is a processing to automatically determine whether to set the subject which has been the imaging target at the time of the reception of the change instruction and another subject to be the imaging target under the same criteria and to automatically capture an image of the determined imaging target.

17. A non-transitory storage medium storing a program for causing an imaging apparatus to execute a control method, the control method comprising:
capturing an image of a subject;
searching for a subject which is an imaging target to be captured in the capturing;
receiving a change instruction for changing the imaging target without specifying a change destination imaging target; and
searching for another subject in a case where the change instruction is received,
wherein, in a search started upon reception of the change instruction, another subject is preferentially determined to be the imaging target over the subject which is the imaging target at the time of the reception of the change instruction,
wherein, in a case where no subject is detected in a search for subject change started upon reception of the change instruction, automatic image capture processing is started,
wherein the automatic image capture processing is a processing to automatically determine whether to set the subject which has been the imaging target at the time of the reception of the change instruction and another subject to be the imaging target under the same criteria and to automatically capture an image of the determined imaging target.

* * * * *